US011621810B2

(12) United States Patent
Liang et al.

(10) Patent No.: US 11,621,810 B2
(45) Date of Patent: *Apr. 4, 2023

(54) GROUPING AND USE OF SHORT SEQUENCE SIGNALS

(71) Applicant: ZTE Corporation, Guangdong (CN)

(72) Inventors: Chunli Liang, Guangdong (CN); Shuqiang Xia, Guangdong (CN); Zhisong Zuo, Guangdong (CN); Peng Hao, Guangdong (CN); Xianghui Han, Guangdong (CN)

(73) Assignee: ZTE Corporation, Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/694,137

(22) Filed: Mar. 18, 2022

(65) Prior Publication Data

US 2022/0216933 A1 Jul. 7, 2022

Related U.S. Application Data

(63) Continuation of application No. 16/872,252, filed on May 11, 2020, which is a continuation of application No. PCT/CN2017/110525, filed on Nov. 10, 2017.

(51) Int. Cl.
*H04J 13/00* (2011.01)
*H04J 11/00* (2006.01)
*H04J 13/16* (2011.01)
*H04L 5/00* (2006.01)
*H04L 25/03* (2006.01)
(Continued)

(52) U.S. Cl.
CPC ........ *H04L 5/0021* (2013.01); *H04J 13/0062* (2013.01); *H04L 25/03178* (2013.01); *H04L 27/2613* (2013.01); *H04L 27/2692* (2013.01); *H04W 72/0413* (2013.01)

(58) Field of Classification Search
USPC .......................................................... 370/329
See application file for complete search history.

(56) References Cited

U.S. PATENT DOCUMENTS 10,375,734 B2 8/2019 Suzuki et al.
2003/0112857 A1 6/2003 Cleveland
(Continued)

FOREIGN PATENT DOCUMENTS

CA 3082232 A1 5/2019
CN 1429440 A 7/2003
(Continued)

OTHER PUBLICATIONS

Huawei, 3GPP TSG RAN WG1 Meeting AH_NR#3 R1-1715399 (Year: 2017).*
(Continued)

*Primary Examiner* — Jeffrey M Rutkowski
*Assistant Examiner* — Luna Weissberger
(74) *Attorney, Agent, or Firm* — Perkins Coie LLP (57) ABSTRACT

New sequences have been proposed and/or adopted for short Physical Uplink Control Channel communications between base stations and UEs. In an exemplary embodiment, a UE communicates with a base station based on sequence groups that include the new sequences, where the new sequences are allocated to different sequence groups based, at least in part, on correlations with other existing sequences included in individual sequence groups.

14 Claims, 5 Drawing Sheets

(51) Int. Cl.
*H04L 27/26* (2006.01)
*H04W 72/04* (2023.01)

(56) References Cited

U.S. PATENT DOCUMENTS

| | | | |
|---|---|---|---|
| 2009/0046645 | A1 | 2/2009 | Bertrand et al. |
| 2012/0076100 | A1 | 3/2012 | Noh et al. |
| 2014/0247799 | A1 | 9/2014 | Suzuki et al. |
| 2015/0372780 | A1 | 12/2015 | Qu et al. |
| 2016/0125130 | A1 | 5/2016 | Le Cocq et al. |
| 2017/0041892 | A1 | 2/2017 | Xia et al. |
| 2017/0041930 | A1 | 2/2017 | Imamura et al. |
| 2017/0170922 | A1 | 6/2017 | Noh et al. |
| 2019/0104007 | A1 | 4/2019 | Wang et al. |
| 2019/0215122 | A1 | 7/2019 | Gong et al. |
| 2020/0274630 | A1 | 8/2020 | Liang et al. |
| 2020/0396113 | A1 | 12/2020 | Liang et al. |

FOREIGN PATENT DOCUMENTS

| | | | | |
|---|---|---|---|---|
| CN | 101179860 | A | 5/2008 | |
| CN | 101330321 | A | 12/2008 | |
| CN | 101341786 | A | 1/2009 | |
| CN | 102238747 | A | 11/2011 | |
| CN | 102983957 | A | 3/2013 | |
| CN | 103139916 | A | 6/2013 | |
| CN | 105680979 | A | 6/2016 | |
| CN | 106134140 | A | 11/2016 | |
| CN | 106973402 | A | 7/2017 | |
| CN | 107222282 | A | 9/2017 | |
| CN | 109245871 | A | 1/2019 | |
| EP | 3684021 | A1 | 7/2020 | |
| JP | 2012-527154 | A | 11/2012 | |
| JP | 2013-081055 | A | 5/2013 | |
| KR | 10-2012-0023200 | A | 3/2012 | |
| KR | 10-1520682 | B1 | 5/2015 | |
| WO | 2008155907 | A1 | 12/2008 | |
| WO | 2013079009 | A1 | 6/2013 | |
| WO | 2015149301 | A1 | 10/2015 | |
| WO | WO-2018060969 | A1 * | 4/2018 | ......... H04L 27/2085 |
| WO | 2019047622 | A1 | 3/2019 | |

OTHER PUBLICATIONS

Office Action for Chinese Patent Application No. 202110436474.0, dated Aug. 26, 2022 (12 pages).
Office Action for Korean Patent Application No. 10-2020-7016375, dated Jul. 14, 2022, with English summary (11 pages).
Huawei, et al., "Discussion on grouping of CGS sequence," 3GPP TSG RAN WG1 Ad Hoc Meeting, Vancouver, Canada, R1-1800088, 8 pages, Jan. 2018.
Huawei, et al., "On CGS ordering for NR", 3GPP TSG RAN WG1 Meeting #92bis, Sanya, China, R1-1804433, 13 pages, Apr. 2018.
Intel Corporation, "Further discussion on SRS for NR," 3GPP TSG RAN WG1 NR Ad-Hoc meeting, Spokane, Washington, USA, R1-1700356, 8 pages, Jan. 2017.
International Search Report and Written Opinion dated Aug. 6, 2018 for International Application No. PCT/CN2018/076298, filed on Feb. 11, 2018 (9 pages).
International Search Report and Written Opinion dated Jul. 31, 2018 for International Application No. PCT/CN2017/110525, filed on Nov. 10, 2017 (7 pages).
Nokia, et al., "UL DMRS Base Sequences with IFDMA," 3GPP TSG RAN WG1 Meeting #86, Gothenburg, Sweden, R1-167087, 4 pages, Aug. 2016.
ZTE, et al., "On short PUCCH for up to 2 bits UCI," 3GPP TSG RAN WG1 Meeting #91, Reno, Nevada, USA, R1-1719672, 10 pages, Nov. 2017.
CATT, "On short PUCCH design for up to two UCI bits," 3GPP TSG RAN WG1 Meeting 90bis, Prague, Czech Republic, R1-1717826, 5 pages, Oct. 2017.
CATT, "On short PUCCH formats supporting up to two UCI bits," 3GPP TSG RAN WG1 Meeting NR#3, Nagoya, Japan, R1-1715817, 4 pages, Sep. 2017.
Extended European Search Report for European Patent Application No. 17931303.6, dated Oct. 12, 2020 (10 pages).
Office Action for Chinese Patent Application No. 201880086147.3, dated Nov. 24, 2020.
Office Action for Chinese Patent Application No. 201780098147.0, dated Dec. 11, 2020.
Search Report and Written Opinion for Singapore Patent Application No. 11202004267R, dated Apr. 27, 2021.
First Examination Report for Indian Patent Application No. 202047022529, dated Jun. 23, 2021.
Extended European Search Report for European Patent Application No. 18876352.8, dated Jul. 16, 2021 (9 pages).
Office Action for Japanese Patent Application No. 2020-525979, dated Aug. 3, 2021, with English summary (6 pages).
Office Action for Canadian Patent Application No. 3,082,232, dated Aug. 17, 2021 (4 pages).
Office Action for Canadian Patent Application No. 3,082,236, dated Sep. 2, 2021 (4 pages).
Huawei et al., "Long PUCCH for up to 2 bits UCI," 3GPP TSG RAN WG1 Meeting #90, Prague, Czech Republic, R1-1712192, 7 pages, Aug. 2017.
Office Action for Singapore Patent Application No. 11202004262S, dated Sep. 27, 2021 (6 pages).
"Physical channels and modulation (Release 15)," 3GPP TS 38.211 V1.1.0 (Oct. 2017).
"Physical channels and modulation (Release 13)," 3GPP TS 36.211 V13.7.0 (Sep. 2017).
Office Action for Korean Patent Application No. 10-2020-7016379, dated Oct. 19, 2021 (6 pages).
Office Action for Japanese Patent Application No. 2020-525949, dated Nov. 9, 2021 (4 pages).
First Examination Report for Indian Patent Application No. 202047022530, dated Dec. 2, 2021 (7 pages).
Communication pursuant to Article 94(3) EPC for European Patent Application No. 17931303.6, dated Nov. 16, 2021 (6 pages).
Office Action for Chinese Patent Application No. 202110536388.7, dated Dec. 27, 2021 (10 pages).
Final Examination Report for Singapore Patent Application No. 11202004262S, dated Feb. 28, 2022 (5 pages).
Huawei et al., "Short PUCCH for UCI of up to 2 bits," 3GPP TSG RAN WG1 Meeting AH_NR#3, Nagoya, Japan, R1-1715399, 17 pages, Sep. 2017.
Ericsson, "Summary of Short PUCCH structure (7.3.2.1)," 3GPP TSG RAN WG1 Meeting AH_NR#3, Nagoya, Japan, R1-1718862, 17 pages, Sep. 2017.
Notice of Allowance for Korean Patent Application No. 10-2020-7016379, dated Mar. 28, 2022 (6 pages).
Office Action for Korean Patent Application No. 10-2020-7016375, dated Jan. 17, 2023, with English summary (5 pages).
Office Action for Canadian Patent Application No. 3,082,236, dated Jan. 18, 2023 (4 pages).
Communication pursuant to Article 94(3) EPC for European Patent Application No. 18876352.8, dated Jan. 27, 2023 (5 pages).
Communication pursuant to Article 94(3) EPC for European Patent Application No. 17931303.6, dated Jan. 27, 2023 (5 pages).

* cited by examiner

GROUPING AND USE OF SHORT SEQUENCE SIGNALS

CROSS REFERENCE TO RELATED APPLICATIONS

This patent document is a continuation of and claims priority to U.S. patent application Ser. No. 16/872,252, filed May 11, 2020, which is a continuation of International Patent Application No. PCT/CN2017/110525, filed on Nov. 10, 2017. The entire content of the before-mentioned patent applications is incorporated by reference as part of the disclosure of this application.

TECHNICAL FIELD

This disclosure is directed generally to digital wireless communications.

BACKGROUND

Mobile telecommunication technologies are moving the world toward an increasingly connected and networked society. In comparison with the existing wireless networks, next generation systems and wireless communication techniques will need to support a much wider range of use-case characteristics and provide a more complex and sophisticated range of access requirements and flexibilities.

Long-Term Evolution (LTE) is a standard for wireless communication for mobile devices and data terminals developed by 3rd Generation Partnership Project (3GPP). LTE Advanced (LTE-A) is a wireless communication standard that enhances the LTE standard. The 5th generation of wireless system, known as 5G, advances the LTE and LTE-A wireless standards and is committed to supporting higher data-rates, large number of connections, ultra-low latency, high reliability and other emerging business needs.

SUMMARY

This disclosure relates to methods, systems, and devices for grouping and using short sequences in wireless communications, such as Physical Uplink Control Channel (PUCCH) and/or short PUCCH transmissions.

An exemplary embodiment discloses a method for wireless communication. The method comprises communicating with a wireless communication node based, at least in part, on a distinguished target sequence included in a distinguished sequence group, the distinguished sequence group selected from a plurality of sequence groups. The distinguished target sequence is a member of a target sequence set, and each target sequence of the target sequence set is allocated to an individual sequence group of the plurality of sequence groups based, at least in part, on a value of correlation between the target sequence and at least one other sequence of the individual sequence group. In some embodiments, the distinguished sequence group is selected based, at least in part, on identification of at least a cell, user, or communication channel.

In some embodiments, each target sequence of the target sequence set is a distinct length-12 sequence. In some embodiments, each distinct length-12 sequence corresponds to a mathematical form of:

$$r(n)=e^{j\pi\varphi(n)/4}, n=0,1,2,\ldots,11$$

In some embodiments, communicating with the wireless communication node comprises using the distinguished target sequence for transmitting wireless signals to the wireless communication node or receiving wireless signals from the wireless communication node. In some embodiments, the wireless communication node is a user equipment (UE) or a base station.

In some embodiments, the value of correlation between the target sequence and the at least one other sequence is calculated based on:

$$xcorr\_coeffs=NFFT*IFFT(Seq1.*conj(Seq2), NFFT)/length(Seq1)$$

wherein, IFFT(X,N) is the Npoint Inverse Fourier Transform operation, Seq1 denotes the target sequence, Seq2 denotes one other sequence, and conj( ) is the complex conjugate operation.

In some embodiments, each target sequence of the target sequence set is allocated to an individual sequence group of the plurality of sequence groups is further based on a comparison of (1) the value of correlation between the target sequence and the at least one other sequence of the individual sequence group and (2) at least a value of correlation between the target sequence and one or more sequences of another sequence group.

In some embodiments, the at least one other sequence includes at least a length-X sequence, wherein X=12N and N is an integer larger than 0. In some embodiments, the length-X sequence is a length-24 sequence that corresponds to a mathematical form of:

$$r(n)=e^{j\pi\varphi(n)/4}, n=0,1,2,\ldots,23$$

In some embodiments, u is a group index that identifies one of the plurality of sequence groups and wherein relationships between values of u and values of $\varphi(n)$ are shown in the table below:

| u | $\varphi(0),\ldots,\varphi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |

-continued

| u | φ(0), . . . , φ(23) |
|---|---|
| 16 | −1 −3  3 −1 −1 −1 −1  1  1 −3  3  1  3  3  1 −1  1 −3  1 −3  1  1 −3 −1 |
| 17 |  1  3 −1  3  3 −1 −3  1 −1 −3  3  3  3 −1  1  1  3 −1 −3 −1  3 −1 −1 −1 |
| 18 |  1  1  1  1  1 −1  3 −1 −3  1  1  3 −3  1 −3 −1  1  1 −3 −3  3  1  1 −3 |
| 19 |  1  3  3  1 −1 −3  3 −1  3  3  3 −3  1 −1  1 −1 −3 −1  1  3 −1  3 −3 −3 |
| 20 | −1 −3  3 −3 −3 −3 −1 −1 −3 −1 −3  3  1  3 −3 −1  3 −1  1 −1  3 −3  1 −1 |
| 21 | −3 −3  1  1 −1  1 −1  1 −1  3  1 −3 −1  1 −1  1 −1 −1  3  3 −3 −1  1 −3 |
| 22 | −3 −1 −3  3  1 −1 −3 −1 −3 −3  3 −3  3 −3 −1  1  3  1 −3  1  3  3 −1 −3 |
| 23 | −1 −1 −1 −1  3  3  3  1  3  3 −3  1  3 −1  3 −1  3  3 −3  3  1 −1  3  3 |
| 24 |  1 −1  3  3 −1 −3  3 −3 −1 −1  3 −1  3 −1 −1  1  1  1  1 −1 −1 −3 −1  3 |
| 25 |  1 −1  1 −1  3 −1  3  1  1 −1 −1 −3  1  1 −3  1  3 −3  1  1 −3 −3 −1 −1 |
| 26 | −3 −1  1  3  1  1 −3 −1 −1  3  3 −3  3  1 −3  3 −3  1 −1  1 −3  1  1  1 |
| 27 | −1 −3  3  3  1  1  3 −1 −3 −1 −1 −1  3  1 −3 −3 −1  3 −3 −1 −3 −1 −3 −1 |
| 28 | −1 −3 −1 −1  1 −3 −1 −1  1 −1 −3  1  1 −3  1 −3 −3  3  1  1 −1  3 −1 −1 |
| 29 |  1  1 −1 −1 −3 −1  3 −1  3 −1  1  3  1 −1  3  1  3 −3 −3  1 −1 −1  1  3 |

In some embodiments, the plurality of sequence groups includes at least one of:

a sequence group including a length-12 target sequence and one other length-24 sequence, wherein the length-12 target sequence corresponds to φ(n)=[3 1 3 1 3 −3 −1 1 3 1 −1 −3] and wherein the other length-24 sequence corresponds to $r_u(n)$ with u=24, a sequence group including a length-12 target sequence and one other length-24 sequence, wherein the length-12 target sequence corresponds to φ(n)=[−3 3 3 3 −1 −3 −3 −1 −3 1 3 −3] and wherein the other length-24 sequence corresponds to $r_u(n)$ with u=8, a sequence group including a length-12 target sequence and one other length-24 sequence, wherein the length-12 target sequence corresponds to φ(n)=[3 −1 −3 3 −3 −1 3 3 3 −3 −1 −3] and wherein the other length-24 sequence corresponds to $r_u(n)$ with u=9, a sequence group including a length-12 target sequence and one other length-24 sequence, wherein the length-12 target sequence corresponds to φ(n)=[−3 −1 3 −3 −3 −1 −3 1 −1 −3 3 3] and wherein the other length-24 sequence corresponds to $r_u(n)$ with u=17, a sequence group including a length-12 target sequence and one other length-24 sequence, wherein the length-12 target sequence corresponds to φ(n)=[1 3 −3 1 3 3 3 1 −1 1 −1 3] and wherein the other length-24 sequence corresponds to $r_u(n)$ with u=14, or a sequence group including a length-12 target sequence and one other length-24 sequence, wherein the length-12 target sequence corresponds to φ(n)=[−3 1 −1 −1 3 3 −3 −1 −1 −3 −1 −3] and wherein the other length-24 sequence corresponds to $r_u(n)$ with u=11. In some embodiments, fewer than 3 sequence pairs between a length-12 sequence in any sequence group of the plurality of sequence groups and a length-24 sequence in any other sequence group of the plurality of sequence groups have corresponding values of correlation that exceed 0.8.

In some embodiments, the length-X sequence is a length-36 sequence that corresponds to a mathematical form of:

$$\bar{r}_{u,v}(n) = x_q(n \bmod N_{ZC}^{RS}), \quad 0 \le n < M_{sc}^{RS},$$

wherein the $q^{th}$ root Zadoff-Chu sequence is defined by:

$$x_q(m) = e^{-j\frac{\pi q m(m+1)}{N_{ZC}^{RS}}}, \quad 0 \le m \le N_{ZC}^{RS} - 1$$

wherein q is given by:

$$q = \lfloor \bar{q} + 1/2 \rfloor + v \cdot (-1)^{\lfloor 2\bar{q} \rfloor}$$

$$\bar{q} = N_{ZC}^{RS} \mathbf{19}(u+1)/31,$$

and
wherein the length $N_{ZC}^{RS}$ of the Zadoff-Chu sequence is given by the largest prime number such that $N_{ZC}^{RS} < M_{sc}^{RS}$ where $M_{SC}^{RS} = X$.

In some embodiments, the plurality of sequence groups include at least one of:

a sequence group including a length-12 target sequence and one other length-36 sequence, wherein the length-12 target sequence corresponds to φ(n)=[3 −1 −3 3 −3 −1 3 3 3−3 −1 −3] and wherein the other length-36 sequence corresponds to $\bar{r}_{u,v}(n)$ with u=23 and v=0, a sequence group including a length-12 target sequence and one other length-36 sequence, wherein the length-12 target sequence corresponds to φ(n)=[1 −1 3 −1 −1 −1 −3 −1 1 1 1 −3] and wherein the other length-36 sequence corresponds to $\bar{r}_{u,v}(n)$ with u=6 and v=0, a sequence group including a length-12 target sequence and one other length-36 sequence, wherein the length-12 target sequence corresponds to φ(n)=[−1 −1 −1 −1 1 −3 −1 3 3 −1 −3 1] and wherein the other length-36 sequence corresponds to $\bar{r}_{u,v}(n)$ with u=16 and v=0, a sequence group including a length-12 target sequence and one other length-36 sequence, wherein the length-12 target sequence corresponds to φ(n)=[−3 −3 3 3 3 −3 −1 1 −3 3 1 −3] and wherein the other length-36 sequence corresponds to $r_{u,v}(n)$ with u=27 and v=0, a sequence group including a length-12 target sequence and one other length-36 sequence, wherein the length-12 target sequence corresponds to φ(n)=[−3 −3 3 −3 −1 3 3 3 −1 −3 1 −3] and wherein the other length-36 sequence corresponds to $\bar{r}_{u,v}(n)$ with u=22 and v=0, a sequence group including a length-12 target sequence and one other length-36 sequence, wherein the length-12 target sequence corresponds to φ(n)=[−3 3 1 −3 1 3 −1 −1 1 3 3 3] and wherein the other length-36 sequence corresponds to $\bar{r}_{u,v}(n)$ with u=1 and v=0, a sequence group including a length-12 target sequence and one other length-36 sequence, wherein the length-12 target sequence corresponds to φ(n)=[−3 3 3 1 −3 3 −1 1 3 −3 3 −3] and wherein the other length-36 sequence corresponds to $\bar{r}_{u,v}(n)$ with u=2 and v=0, or a sequence group including a length-12 target sequence and one other length-36 sequence, wherein the length-12 target sequence corresponds to φ(n)=[−3 1 3 −1 −1 −3 −3 −1 −1 3 1 −3] and wherein the other length-36 sequence corresponds to $\bar{r}_{u,v}(n)$ with u=15 and v=0. In some embodiments, fewer than 2 sequence pairs between a length-12 sequence in any sequence group of the plurality of sequence groups and a length-36 sequence in any other sequence group of the plurality of sequence groups has a corresponding value of correlation that exceeds 0.8.

In some embodiments, the plurality of sequence groups include at least one of:

a sequence group including a length-12 target sequence, one other length-24 sequence, and one other length-36 sequence, wherein the length-12 target sequence corresponds to $\varphi(n)=[3\ -1\ -3\ 3\ -3\ -1\ 3\ 3\ 3\ -3\ -1\ -3]$, wherein the other length-24 sequence corresponds to $r_u(n)$ with u=23, and wherein the other length-36 sequence corresponds to $\bar{r}_{u,v}(n)$ with u=23 and v=0, a sequence group including a length-12 target sequence, one other length-24 sequence, and one other length-36 sequence, wherein the length-12 target sequence corresponds to $\varphi(n)=[1\ -1\ 3\ -1\ -1\ -1\ -3\ -1\ 1\ 1\ 1\ -3]$, wherein the other length-24 sequence corresponds to $r_u(n)$ with u=6, and wherein the other length-36 sequence corresponds to $\bar{r}_{u,v}(n)$ with u=6 and v=0, a sequence group including a length-12 target sequence, one other length-24 sequence, and one other length-36 sequence, wherein the length-12 target sequence corresponds to $\varphi(n)=[-1\ -1\ -1\ -1\ 1\ -3\ -1\ 3\ 3\ -1\ -3\ 1]$, wherein the other length-24 sequence corresponds to $r_u(n)$ with u=16, and wherein the other length-36 sequence corresponds to $\bar{r}_{u,v}(n)$ with u=16 and v=0, a sequence group including a length-12 target sequence, one other length-24 sequence, and one other length-36 sequence, wherein the length-12 target sequence corresponds to $\varphi(n)=[3\ 1\ 3\ 1\ 3\ -3\ -1\ 1\ 3\ 1\ -1\ -3]$, wherein the other length-24 sequence corresponds to $r_u(n)$ with u=24, and wherein the other length-36 sequence corresponds to $\bar{r}_{u,v}(n)$ with u=24 and v=0, a sequence group including a length-12 target sequence, one other length-24 sequence, and one other length-36 sequence, wherein the length-12 target sequence corresponds to $\varphi(n)=[-3\ -3\ 3\ 3\ 3\ -3\ -1\ 1\ -3\ 3\ 1\ -3]$, wherein the other length-24 sequence corresponds to $r_u(n)$ with u=27, and wherein the other length-36 sequence corresponds to $\bar{r}_{u,v}(n)$ with u=27 and v=0, a sequence group including a length-12 target sequence, one other length-24 sequence, and one other length-36 sequence, wherein the length-12 target sequence corresponds to $\varphi(n)=[-3\ 3\ 3\ 3\ -1\ -3\ -3\ -1\ -3\ 1\ 3\ -3]$, wherein the other length-24 sequence corresponds to $r_u(n)$ with u=8, and wherein the other length-36 sequence corresponds to $\bar{r}_{u,v}(n)$ with u=8 and v=0, a sequence group including a length-12 target sequence, one other length-24 sequence, and one other length-36 sequence, wherein the length-12 target sequence corresponds to $\varphi(n)=[-3\ 3\ 1\ -3\ 1\ 3\ -1\ -1\ 1\ 3\ 3\ 3]$, wherein the other length-24 sequence corresponds to $r_u(n)$ with u=1, and wherein the other length-36 sequence corresponds to $\bar{r}_{u,v}(n)$ with u=1 and v=0, a sequence group including a length-12 target sequence, one other length-24 sequence, and one other length-36 sequence, wherein the length-12 target sequence corresponds to $\varphi(n)=[-3\ 3\ 3\ 1\ -3\ 3\ -1\ 1\ 3\ -3\ 3\ -3]$, wherein the other length-24 sequence corresponds to $r_u(n)$ with u=2, and wherein the other length-36 sequence corresponds to $\bar{r}_{u,v}(n)$ with u=2 and v=0, a sequence group including a length-12 target sequence, one other length-24 sequence, and one other length-36 sequence, wherein the length-12 target sequence corresponds to $\varphi(n)=[-1\ 1\ 1\ -1\ 1\ 3\ 3\ -1\ -1\ -3\ 1\ -3]$, wherein the other length-24 sequence corresponds to $r_u(n)$ with u=9, and wherein the other length-36 sequence corresponds to $\bar{r}_{u,v}(n)$ with u=9 and v=0, a sequence group including a length-12 target sequence, one other length-24 sequence, and one other length-36 sequence, wherein the length-12 target sequence corresponds to $\varphi(n)=[-3\ -1\ 3\ -3\ -3\ -1\ -3\ 1\ -1\ -3\ 3\ 3]$, wherein the other length-24 sequence corresponds to $r_u(n)$ with u=17, and wherein the other length-36 sequence corresponds to $\bar{r}_{u,v}(n)$ with u=17 and v=0, a sequence group including a length-12 target sequence, one other length-24 sequence, and one other length-36 sequence, wherein the length-12 target sequence corresponds to $\varphi(n)=[-3\ -1\ -3\ -1\ -1\ -3\ 3\ 3\ -1\ -1\ 1\ -3]$, wherein the other length-24 sequence corresponds to $r_u(n)$ with u=14, and wherein the other length-36 sequence corresponds to $\bar{r}_{u,v}(n)$ with u=14 and v=0, a sequence group including a length-12 target sequence, one other length-24 sequence, and one other length-36 sequence, wherein the length-12 target sequence corresponds to $\varphi(n)=[-3\ 1\ -1\ -1\ 3\ 3\ -3\ -1\ -1\ -3\ -1\ -3]$, wherein the other length-24 sequence corresponds to $r_u(n)$ with u=11, and wherein the other length-36 sequence corresponds to $\bar{r}_{u,v}(n)$ with u=11 and v=0, or a sequence group including a length-12 target sequence, one other length-24 sequence, and one other length-36 sequence, wherein the length-12 target sequence corresponds to $\varphi(n)=[-3\ 1\ 3\ -1\ -1\ -3\ -3\ -1\ -1\ 3\ 1\ -3]$, wherein the other length-24 sequence corresponds to $r_u(n)$ with u=15, and wherein the other length-36 sequence corresponds to $\bar{r}_{u,v}(n)$ with u=15 and v=0. In some embodiments, (1) fewer than 4 sequence pairs between a length-12 sequence in any sequence group of the plurality of sequence groups and a length-24 sequence in any other sequence group of the plurality of sequence groups have corresponding values of correlation that exceed 0.8 and (2) fewer than 3 sequence pairs between a length-12 sequence in any sequence group of the plurality of sequence groups and a length-36 sequence in any other sequence group of the plurality of sequence groups have corresponding values of correlation that exceed 0.8.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

In the 4th Generation (4G) mobile communication technology of LTE/LTE-A and the 5th Generation (5G) mobile communication technology, more complex and sophisticated range of access requirements and flexibilities are provided or being developed. Currently, enhanced mobile broadband (eMBB), ultra high reliability and low latency communication (URLLC), and massive machine type communications (mMTC) are under study and/or in development for both 4G and 5G systems.

New Radio (NR) technology, currently under standardization in 5G, has proposed the use of short PUCCH transmissions. More specifically, this disclosure relates to the grouping and use of new short sequences that are orthogonal and meet performance requirements of the short PUCCH under consideration in the 3GPP standards organization.

The PUCCH or short PUCCH is a wireless channel used to transmit information from mobile stations or user equipment (UE) to a base station. For example, the UE may use the PUCCH to transmit information such as an Acknowledgement (ACK), Non-Acknowledgement (NACK), and scheduling request (SR). The UE can transmit ACK/NACK to the base station to inform the base station whether the UE has properly decoded the data transmitted by the base station. A scheduling request (SR) is used by the UE to request uplink resources to transmit data.

In the standardization of NR, it has been agreed that sequences with low peak to average power ratio (PAPR) be adopted for short PUCCH to carry up to 2 bits of uplink control information (UCI). In comparison, LTE adopted computer generated constant amplitude zero auto correlation (CG-CAZAC) sequences with lengths of 12 and 24 for 1 or 2 resource blocks (RBs) and adopted cyclic extension of Zad-off Chu (ZC) sequences for 3 or more RBs. The NR sequence requirements are more stringent (e.g., requiring a lower cubic metric/peak to average power ratio (CM/PAPR)). The length-12 sequences currently used in LTE may not satisfy these new requirements. Therefore, new sequences with low CM/PAPR have been proposed. In the 3GPP RAN1 90bis meeting, a set of 30 length-12 base sequences for short PUCCH has been adopted for NR. The set of sequences can be expressed as:

$$r(n) = e^{j\pi\varphi(n)/4}, n=0,1,2,\ldots,11$$

where $\varphi(n)$ is listed in Table-1 below.

TABLE-1 definition of $\phi(n)$ for the length-12 sequences adopted for NR

| Sequence Index | $\phi(0)$ | $\phi(1)$ | $\phi(2)$ | $\phi(3)$ | $\phi(4)$ | $\phi(5)$ | $\phi(6)$ | $\phi(7)$ | $\phi(8)$ | $\phi(9)$ | $\phi(10)$ | $\phi(11)$ |
|---|---|---|---|---|---|---|---|---|---|---|---|---|
| 0 | 1 | −1 | 3 | 1 | 1 | −1 | −1 | −1 | 1 | 3 | −3 | 1 |
| 1 | −1 | −1 | −1 | −1 | 1 | −3 | −1 | 3 | 3 | −1 | −3 | 1 |
| 2 | −3 | 1 | −3 | −3 | −3 | 3 | −3 | −1 | 1 | 1 | 1 | −3 |
| 3 | −3 | 3 | 1 | 3 | −3 | 1 | 1 | 1 | 1 | 3 | −3 | 3 |
| 4 | −3 | 1 | 3 | −1 | −1 | −3 | −3 | −1 | −1 | 3 | 1 | −3 |
| 5 | −1 | 1 | 1 | −1 | 1 | 3 | 3 | −1 | −1 | −3 | 1 | −3 |
| 6 | −3 | −3 | −1 | 3 | 3 | 3 | −3 | 3 | −3 | 1 | −1 | −3 |
| 7 | −3 | 3 | −3 | 3 | 3 | −3 | −1 | −1 | 3 | 3 | 1 | −3 |
| 8 | −3 | −1 | −3 | −1 | −1 | −3 | 3 | 3 | −1 | −1 | 1 | −3 |
| 9 | −3 | 3 | 3 | 3 | −1 | −3 | −3 | −1 | −3 | 1 | 3 | −3 |
| 10 | 1 | 3 | −3 | 1 | 3 | 3 | 3 | 1 | −1 | 1 | −1 | 3 |
| 11 | −1 | −3 | 3 | −1 | −3 | −3 | −3 | −1 | 1 | −1 | 1 | −3 |
| 12 | 3 | 1 | 3 | 1 | 3 | −3 | −1 | 1 | 3 | 1 | −1 | −3 |
| 13 | −3 | −3 | 3 | 3 | 3 | −3 | −1 | 1 | −3 | 3 | 1 | −3 |
| 14 | −3 | −1 | 1 | −3 | 1 | 3 | 3 | 3 | −1 | −3 | 3 | 3 |
| 15 | −3 | −3 | 3 | 1 | −3 | −3 | −3 | −1 | 3 | −1 | 1 | 3 |
| 16 | −1 | 1 | 3 | −3 | 1 | −1 | 1 | −1 | −1 | −3 | 1 | −1 |
| 17 | −3 | −1 | −1 | 1 | 3 | 1 | 1 | −1 | 1 | −1 | −3 | 1 |
| 18 | −3 | −1 | 3 | −3 | −3 | −1 | −3 | 1 | −1 | −3 | 3 | 3 |
| 19 | −3 | −3 | 3 | −3 | −1 | 3 | 3 | 3 | −1 | −3 | 1 | −3 |
| 20 | −3 | 1 | −1 | −1 | 3 | 3 | −3 | −1 | −1 | −3 | −1 | −3 |
| 21 | −3 | 1 | 3 | 3 | −1 | −1 | −3 | 3 | 3 | −3 | 3 | −3 |
| 22 | −3 | −1 | −1 | −3 | −3 | −1 | −3 | 3 | 1 | 3 | −1 | −3 |
| 23 | −3 | −1 | 3 | 1 | −3 | −1 | −3 | 3 | 1 | 3 | 3 | 1 |
| 24 | −3 | 3 | 3 | 1 | −3 | 3 | −1 | 1 | 3 | −3 | 3 | −3 |
| 25 | 3 | −1 | −3 | 3 | −3 | −1 | 3 | 3 | 3 | −3 | −1 | −3 |
| 26 | 1 | −1 | 3 | −1 | −1 | −1 | −3 | −1 | 1 | 1 | 1 | −3 |
| 27 | −3 | 3 | 1 | −3 | 1 | 3 | −1 | −1 | 1 | 3 | 3 | 3 |
| 28 | −3 | 3 | −3 | 3 | −3 | −3 | 3 | −1 | −1 | 1 | 3 | −3 |
| 29 | −3 | 3 | 1 | −1 | 3 | −3 | 1 | −1 | 1 | −1 | 1 | |

In LTE, uplink sequences are grouped into multiple sequence groups for use in wireless communications. For example, each sequence group can include at least two sequences of different lengths, and different sequence groups can be allocated for use by different cells. In NR, similar sequence grouping and allocation can be adopted. As discussed above, new length-12 sequences have been introduced in NR. Therefore, sequence grouping and allocation for the newly introduced length-12 sequences is desired. The presently disclosed technology addresses the grouping of the length-12 sequences adopted in NR with other sequences (e.g., sequences currently used in LTE), and the use of the newly configured sequence groups in wireless communications.

Figure 1:
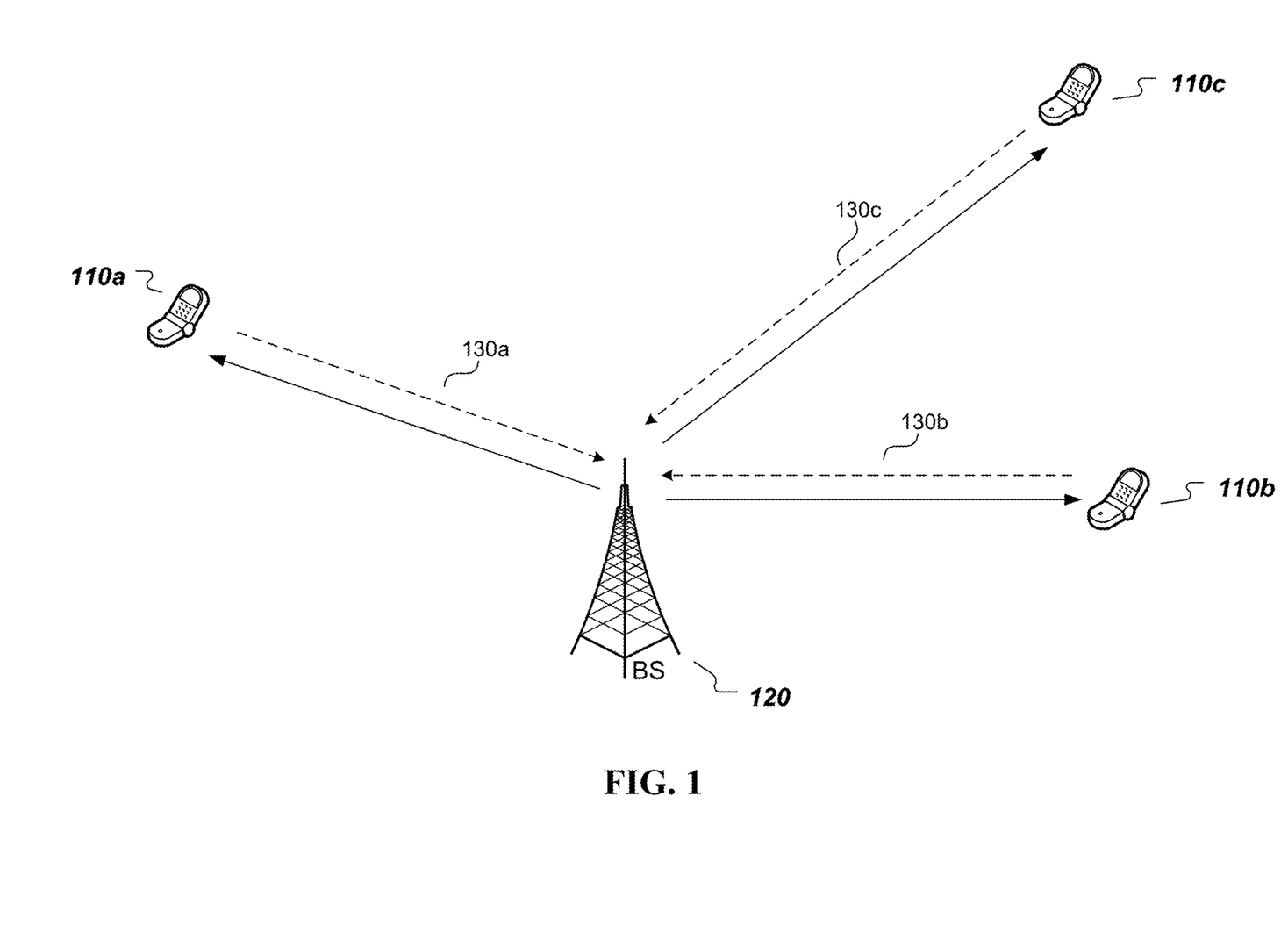
FIG. 1 shows an exemplary base station and UEs in wireless communication that uses PUCCH and/or short PUCCH channels, in accordance with some embodiments of the presently disclosed technology.

FIG. 1 shows an exemplary base station and UEs in wireless communications that use PUCCH and/or short PUCCH channels. The base station (120) can transmit channel resources allocated to the plurality of UEs (110a-110c). The UEs (110a-110c) can transmit information using allocated sequences via PUCCH and/or short PUCCH channels (130a-130c) to the base station (120). The presently disclosed technology provides various embodiments of sequence grouping and use in wireless communications between the base station and the UEs.

Short Sequence Grouping

When sequences are used for wireless communications, signal interference between different cells can depend on the correlation between the sequences used. In order to minimize inter-cell interference, it is desirable to have low correlations between sequences used by different cells. In other words, it is desirable to have high cross-correlations between sequences of different lengths that are included in a same group. Accordingly, in some embodiments, the presently disclosed technology includes allocating into a same sequence group sequences that (1) have different lengths and (2) have high cross-correlations between or among themselves. In allocating the newly introduced NR sequences into existing LTE sequence groups, the presently disclosed technology accounts for cross-correlations between these newly introduced sequences and the existing LTE sequences.

Figure 2:
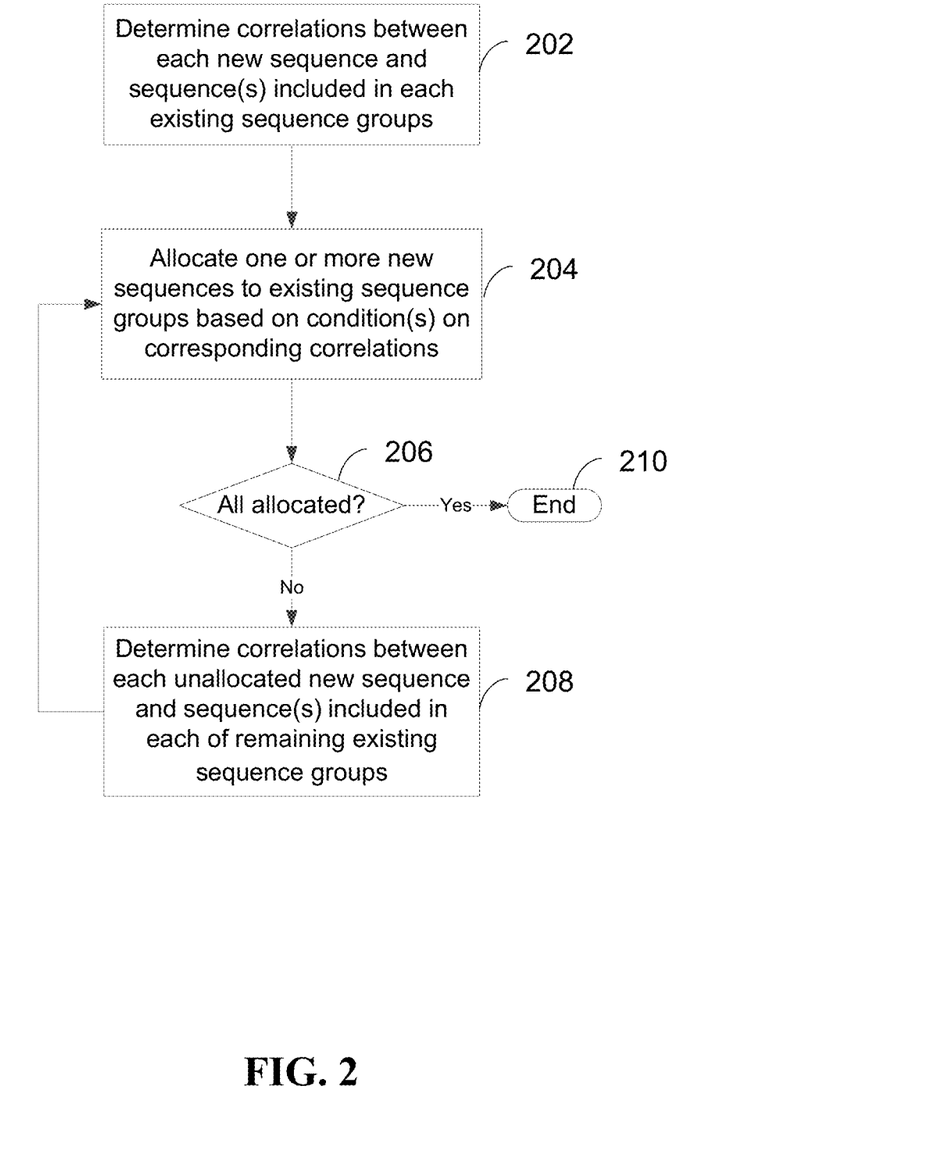
FIG. 2 shows an exemplary flowchart of a method for allocating new sequences into existing sequence groups, in accordance with some embodiments of the presently disclosed technology.

FIG. 2 shows an exemplary flowchart of a method for allocating new sequences (e.g., the newly introduced length-12 NR sequences) into existing sequence groups (e.g., sequence groups currently used in LTE), in accordance with some embodiments of the presently disclosed technology. For purposes of illustration, the newly generated length-12 NR sequences are denoted by $S_{1,i}$, where i represents a sequence index selected from 0, 1, 2, ..., 29 and the value of $S_{1,i}$ can be found in Table-1 above. Current LTE sequences of length-X are denoted by $S_{2,u}$, wherein X can be 12, 24, 36 or other multiples of 12 and specific $S_{2,u}$ values can be found in TS36.211. The sequences of $S_{2,u}$ belong to 30 sequence groups, where u represents a sequence group index selected from 0, 1, 2, ..., 29.

With reference to FIG. 2, at block 202, the method includes determining correlations between each new sequence and sequence(s) included in each existing sequence groups. Illustratively, the method includes computing cross correlations between each of the 30 $S_{1,i}$ sequences and the $S_{2,u}$ sequence included in each of the 30 sequence groups. The cross correlation values can be represented in a cross correlation matrix $XCORR_{i,u}$.

Take length-24 sequences currently used in LTE as an example, the length-24 sequences $S_{2,u}$ can be expressed as:

$$r(n) = e^{j\pi\varphi(n)/4}, n=0,1,2,\ldots,23$$

where φ(n) is shown in Table-2 below and u stands for a sequence group index obtained from Cell ID according to current LTE specifications.

TABLE-2 definition of φ(n) for the length-24 sequences currently used in LTE

| u | φ(0), ..., φ(23) |
|---|---|
| 0  | -1  3  1 -3  3 -1  1  3 -3  3  1  3 -3  3  1  1 -1  1  3 -3  3 -3 -1 -3 |
| 1  | -3  3 -3 -3 -3  1 -3 -3  3 -1  1  1  1  3  1 -1  3 -3 -3  1  3  1  1 -3 |
| 2  |  3 -1  3  3  1  1 -3  3  3  3  3  1 -1  3 -1  1  1 -1 -3 -1 -1  1  3  3 |
| 3  | -1 -3  1  1  3 -3  1  1 -3 -1 -1  1  3  1  3  1 -1  3  1  1 -3 -1 -3 -1 |
| 4  | -1 -1 -1 -3 -3 -1  1  1  3  3 -1  3 -1  1 -1 -3  1 -1 -3 -3  1 -3 -1 -1 |
| 5  | -3  1  1  3 -1  1  3  1 -3  1 -3  1  1 -1 -1  3 -1 -3  3 -3 -3 -3  1  1 |
| 6  |  1  1 -1 -1  3 -3 -3  3 -3  1 -1 -1  1 -1  1  1 -1  3 -1  1 -1  3 -3 -3 |
| 7  | -3  3  3 -1 -1 -3 -1  3  1  3  1  3  1  1 -1  3  1 -1  1  3 -3 -1 -1  1 |
| 8  | -3  1  3 -3  1 -1 -3  3 -3  3 -1 -1 -1 -1  1 -3 -3 -3  1 -3 -3 -3  1 -3 |
| 9  |  1  1 -3  3  3 -1 -3 -1  3 -3  3  3  3 -1  1  1 -3  1 -1  1  1 -3  1  1 |
| 10 | -1  1 -3 -3  3 -1  3 -1 -1 -3 -3 -3 -1 -3 -3  1 -1  1  3  3 -1  1 -1  3 |
| 11 |  1  3  3 -3 -3  1  3  1 -1 -3 -3 -3  3  3 -3  3  3 -1 -3  3 -1  1 -3  1 |
| 12 |  1  3  3  1  1  1 -1 -1  1 -3  3 -1  1  1 -3  3  3 -1 -3  3 -3 -1 -3 -1 |
| 13 |  3 -1 -1 -1 -1 -3 -1  3  3  1 -1  1  3  3  3 -1  1  1 -3  1  3 -1 -3  3 |
| 14 | -3 -3  3  1  3  1 -3  3  1  3  1  1  3 -1 -1 -3  1 -3 -1  3  1  1  1  3 |
| 15 | -1 -1  1 -3  1  3 -3  1 -1 -3 -1  3  1  3  1 -1 -3 -3 -1 -1 -3 -3 -3 -1 |
| 16 | -1 -3  3 -1 -1 -1 -1  1  1 -3  3  1  3  3  1 -1  1 -3  1 -3  1  1 -3 -1 |
| 17 |  1  3 -1  3  3 -1 -3  1 -1 -3  3  3  3 -1  1  1  3 -1 -3 -1  3 -1 -1 -1 |
| 18 |  1  1  1  1  1 -1  3 -3 -1  3 -3  1 -3 -1  1 -1 -3 -3  3  1  1 -3 |
| 19 |  1  3  3  1 -1 -3  3 -1  3  3  3 -3  1 -1  1 -1 -3 -1  1  3 -1  3 -3 -3 |
| 20 | -1 -3  3 -3 -3 -3 -1 -1 -3 -1 -3  3  1  3 -3 -1  3 -1  1 -1  3 -3  1 -1 |
| 21 | -3 -3  1  1 -1  1 -1  1 -1  3  1 -3 -1  1 -1  1 -1 -1  3  3 -3 -1  1 -3 |
| 22 | -3 -1 -3  3  1 -1 -3 -1 -3 -3  3 -3  3 -3 -1  1  3  1 -3  1  3  3 -1 -3 |
| 23 | -1 -1 -1 -1  3  3  3  1  3  3 -1  3 -1  3  3 -3  3 -1 -1  3  3 |
| 24 |  1 -1  3  3 -1 -3  3 -3 -1 -1  3 -1  3 -1 -1  1  1  1  1 -1 -1 -3 -1  3 |
| 25 |  1 -1  1 -1  3 -1  3  1  1 -1 -1 -3  1  1 -3  1  3 -3  1  1 -3 -3 -1 -1 |
| 26 | -3 -1  1  3  1  1 -3 -1 -1 -3  3 -3  3  1 -3  3 -3  1 -1  1 -3  1  1  1 |
| 27 | -1 -3  3  3  1  1  3 -1 -3 -1 -1 -1  3  1 -3 -3 -1  3 -3 -1 -3 -1 -3 -1 |
| 28 | -1 -3 -1 -1  1 -3 -1 -1  1 -1 -3  1  1 -3  1 -3 -3  3  1  1 -1  3 -1 -1 |
| 29 |  1  1 -1 -1 -3 -1  3 -1  3 -1  1  3  1 -1  3  1  3 -3 -3  1 -1 -1  1  3 |

The cross correlation between two sequences can be calculated based on the following equation:

$$xcorr\_coeffs = NFFT*IFFT(Seq.1.*conj(Seq2), NFFT)/length(Seq1) \quad (Eq. 1)$$

where IFFT(X, N) is the Npoint Inverse Fourier Transform operation, Seq1 and Seq2 denote the two sequences, conj( ) is the complex conjugate operation.

Figure 3A:
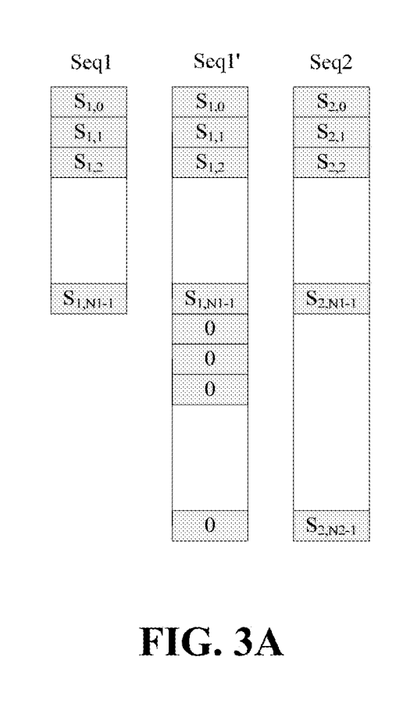
FIGS. 3A and 3B show two examples of zeros padding application, in accordance with some embodiments of the presently disclosed technology.
Figure 3B:
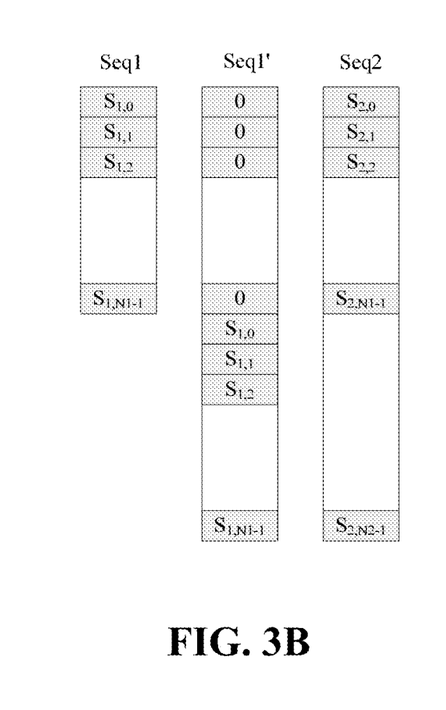

In cases where the length of Seq1 and Seq2 are unequal, zeros padding can be applied to the shorter sequence when performing Seq1.*conj(Seq2). FIGS. 3A and 3B show two examples of zeros padding application, in accordance with some embodiments of the presently disclosed technology.

The cross correlation calculations based on the length-12 NR sequences and length-24 LTE sequences result in a cross correlation matrix $XCORR_{i,u}$ as shown in Table-3 below.

TABLE-3

Example of cross correlation matrix

| i | u=0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | 0.644 | 0.560 | 0.567 | 0.581 | 0.647 | 0.533 | 0.677 | 0.534 | 0.543 | 0.486 | 0.797 | 0.688 | 0.554 | 0.636 | 0.546 |
| 1 | 0.736 | 0.582 | 0.742 | 0.619 | 0.682 | 0.590 | 0.585 | 0.629 | 0.621 | 0.723 | 0.583 | 0.599 | 0.631 | 0.652 | 0.580 |
| 2 | 0.641 | 0.646 | 0.595 | 0.620 | 0.591 | 0.685 | 0.603 | 0.563 | 0.524 | 0.549 | 0.550 | 0.545 | 0.525 | 0.531 | 0.687 |
| 3 | 0.682 | 0.568 | 0.653 | 0.679 | 0.570 | 0.511 | 0.598 | 0.556 | 0.620 | 0.492 | 0.666 | 0.504 | 0.535 | 0.620 | 0.601 |
| 4 | 0.533 | 0.604 | 0.655 | 0.529 | 0.494 | 0.507 | 0.543 | 0.546 | 0.480 | 0.628 | 0.516 | 0.589 | 0.674 | 0.618 | 0.564 |
| 5 | 0.605 | 0.596 | 0.615 | 0.673 | 0.581 | 0.494 | 0.565 | 0.559 | 0.549 | 0.620 | 0.576 | 0.645 | 0.575 | 0.609 | 0.559 |
| 6 | 0.684 | 0.705 | 0.488 | 0.573 | 0.663 | 0.573 | 0.687 | 0.683 | 0.675 | 0.541 | 0.667 | 0.638 | 0.634 | 0.771 | 0.598 |
| 7 | 0.618 | 0.631 | 0.715 | 0.722 | 0.771 | 0.550 | 0.594 | 0.639 | 0.614 | 0.681 | 0.678 | 0.609 | 0.607 | 0.564 | 0.553 |
| 8 | 0.631 | 0.498 | 0.606 | 0.574 | 0.500 | 0.618 | 0.664 | 0.612 | 0.617 | 0.583 | 0.610 | 0.565 | 0.650 | 0.512 | 0.806 |
| 9 | 0.586 | 0.544 | 0.543 | 0.605 | 0.695 | 0.605 | 0.737 | 0.539 | 0.839 | 0.600 | 0.563 | 0.568 | 0.653 | 0.645 | 0.630 |
| 10 | 0.654 | 0.559 | 0.653 | 0.572 | 0.530 | 0.584 | 0.537 | 0.631 | 0.700 | 0.552 | 0.634 | 0.631 | 0.715 | 0.523 | 0.782 |
| 11 | 0.591 | 0.575 | 0.568 | 0.532 | 0.724 | 0.565 | 0.528 | 0.642 | 0.666 | 0.664 | 0.643 | 0.743 | 0.567 | 0.591 | 0.774 |
| 12 | 0.499 | 0.656 | 0.595 | 0.506 | 0.742 | 0.578 | 0.609 | 0.579 | 0.504 | 0.625 | 0.773 | 0.570 | 0.650 | 0.578 | 0.618 |
| 13 | 0.605 | 0.628 | 0.654 | 0.610 | 0.712 | 0.592 | 0.529 | 0.526 | 0.749 | 0.605 | 0.695 | 0.754 | 0.534 | 0.584 | 0.608 |
| 14 | 0.687 | 0.571 | 0.590 | 0.635 | 0.560 | 0.547 | 0.627 | 0.547 | 0.624 | 0.486 | 0.541 | 0.568 | 0.698 | 0.704 | 0.637 |
| 15 | 0.601 | 0.775 | 0.724 | 0.654 | 0.615 | 0.594 | 0.681 | 0.535 | 0.589 | 0.537 | 0.614 | 0.615 | 0.575 | 0.646 | 0.607 |
| 16 | 0.598 | 0.674 | 0.660 | 0.661 | 0.528 | 0.575 | 0.567 | 0.623 | 0.743 | 0.606 | 0.600 | 0.652 | 0.604 | 0.571 | 0.512 |
| 17 | 0.621 | 0.635 | 0.556 | 0.636 | 0.496 | 0.574 | 0.618 | 0.581 | 0.480 | 0.605 | 0.670 | 0.596 | 0.624 | 0.682 | 0.668 |
| 18 | 0.641 | 0.632 | 0.543 | 0.706 | 0.690 | 0.668 | 0.649 | 0.529 | 0.535 | 0.592 | 0.588 | 0.668 | 0.619 | 0.589 | 0.620 |
| 19 | 0.503 | 0.657 | 0.622 | 0.619 | 0.591 | 0.597 | 0.562 | 0.678 | 0.533 | 0.547 | 0.643 | 0.541 | 0.668 | 0.517 | 0.565 |
| 20 | 0.727 | 0.562 | 0.638 | 0.781 | 0.483 | 0.596 | 0.640 | 0.563 | 0.611 | 0.614 | 0.492 | 0.805 | 0.650 | 0.587 | 0.548 |
| 21 | 0.612 | 0.601 | 0.581 | 0.585 | 0.525 | 0.697 | 0.536 | 0.589 | 0.556 | 0.526 | 0.584 | 0.546 | 0.627 | 0.537 | 0.641 |
| 22 | 0.602 | 0.611 | 0.648 | 0.603 | 0.589 | 0.524 | 0.670 | 0.609 | 0.713 | 0.737 | 0.528 | 0.589 | 0.697 | 0.527 | 0.749 |
| 23 | 0.546 | 0.570 | 0.572 | 0.568 | 0.718 | 0.532 | 0.604 | 0.742 | 0.691 | 0.560 | 0.543 | 0.589 | 0.548 | 0.595 | 0.687 |
| 24 | 0.717 | 0.562 | 0.512 | 0.785 | 0.479 | 0.552 | 0.527 | 0.640 | 0.571 | 0.489 | 0.619 | 0.518 | 0.535 | 0.663 | 0.649 |
| 25 | 0.649 | 0.598 | 0.784 | 0.685 | 0.594 | 0.597 | 0.568 | 0.618 | 0.694 | 0.817 | 0.604 | 0.541 | 0.522 | 0.567 | 0.670 |
| 26 | 0.608 | 0.609 | 0.623 | 0.503 | 0.715 | 0.511 | 0.569 | 0.627 | 0.687 | 0.736 | 0.576 | 0.673 | 0.625 | 0.593 | 0.502 |
| 27 | 0.624 | 0.590 | 0.771 | 0.694 | 0.783 | 0.522 | 0.620 | 0.711 | 0.564 | 0.517 | 0.624 | 0.737 | 0.631 | 0.656 | 0.692 |
| 28 | 0.637 | 0.580 | 0.599 | 0.487 | 0.693 | 0.776 | 0.741 | 0.762 | 0.543 | 0.600 | 0.484 | 0.690 | 0.640 | 0.497 | 0.523 |
| 29 | 0.577 | 0.572 | 0.775 | 0.544 | 0.580 | 0.492 | 0.536 | 0.769 | 0.618 | 0.559 | 0.694 | 0.591 | 0.573 | 0.642 | 0.601 |

| i | u=15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|
| 0 | 0.527 | 0.603 | 0.530 | 0.538 | 0.586 | 0.736 | 0.487 | 0.488 | 0.665 | 0.625 | 0.586 | 0.678 | 0.537 | 0.668 | 0.583 |
| 1 | 0.621 | 0.602 | 0.499 | 0.712 | 0.574 | 0.548 | 0.683 | 0.785 | 0.647 | 0.556 | 0.582 | 0.607 | 0.654 | 0.755 | 0.541 |
| 2 | 0.682 | 0.496 | 0.640 | 0.543 | 0.511 | 0.593 | 0.657 | 0.627 | 0.610 | 0.668 | 0.606 | 0.564 | 0.674 | 0.605 | 0.635 |
| 3 | 0.573 | 0.571 | 0.622 | 0.640 | 0.583 | 0.606 | 0.555 | 0.576 | 0.584 | 0.533 | 0.595 | 0.644 | 0.503 | 0.546 | 0.740 |
| 4 | 0.591 | 0.647 | 0.586 | 0.600 | 0.541 | 0.571 | 0.582 | 0.649 | 0.551 | 0.583 | 0.773 | 0.688 | 0.609 | 0.571 | 0.629 |
| 5 | 0.608 | 0.618 | 0.571 | 0.646 | 0.653 | 0.738 | 0.512 | 0.601 | 0.569 | 0.525 | 0.673 | 0.579 | 0.621 | 0.666 | 0.631 |
| 6 | 0.660 | 0.630 | 0.639 | 0.516 | 0.558 | 0.566 | 0.549 | 0.622 | 0.584 | 0.590 | 0.625 | 0.569 | 0.586 | 0.508 | 0.578 |
| 7 | 0.524 | 0.609 | 0.694 | 0.606 | 0.604 | 0.583 | 0.573 | 0.549 | 0.583 | 0.751 | 0.622 | 0.602 | 0.735 | 0.644 | 0.661 |
| 8 | 0.651 | 0.617 | 0.510 | 0.524 | 0.669 | 0.558 | 0.806 | 0.585 | 0.719 | 0.606 | 0.609 | 0.573 | 0.623 | 0.579 | 0.650 |
| 9 | 0.565 | 0.506 | 0.704 | 0.550 | 0.643 | 0.607 | 0.547 | 0.775 | 0.644 | 0.590 | 0.509 | 0.800 | 0.605 | 0.486 | 0.623 |
| 10 | 0.511 | 0.589 | 0.640 | 0.620 | 0.579 | 0.716 | 0.556 | 0.638 | 0.727 | 0.523 | 0.735 | 0.518 | 0.550 | 0.610 | 0.670 |
| 11 | 0.579 | 0.650 | 0.628 | 0.695 | 0.544 | 0.702 | 0.656 | 0.582 | 0.623 | 0.686 | 0.537 | 0.521 | 0.613 | 0.549 | 0.601 |
| 12 | 0.607 | 0.693 | 0.515 | 0.666 | 0.627 | 0.534 | 0.640 | 0.636 | 0.632 | 0.844 | 0.624 | 0.657 | 0.657 | 0.752 | 0.550 |
| 13 | 0.530 | 0.649 | 0.570 | 0.642 | 0.578 | 0.561 | 0.673 | 0.601 | 0.634 | 0.575 | 0.504 | 0.586 | 0.536 | 0.705 | 0.560 |
| 14 | 0.612 | 0.553 | 0.566 | 0.570 | 0.619 | 0.562 | 0.582 | 0.666 | 0.601 | 0.579 | 0.583 | 0.625 | 0.662 | 0.520 | 0.700 |
| 15 | 0.718 | 0.601 | 0.608 | 0.603 | 0.493 | 0.716 | 0.575 | 0.561 | 0.701 | 0.572 | 0.745 | 0.643 | 0.540 | 0.680 | 0.642 |
| 16 | 0.622 | 0.715 | 0.609 | 0.721 | 0.640 | 0.759 | 0.639 | 0.601 | 0.687 | 0.677 | 0.649 | 0.643 | 0.547 | 0.640 | 0.622 |
| 17 | 0.581 | 0.719 | 0.579 | 0.599 | 0.781 | 0.654 | 0.725 | 0.745 | 0.554 | 0.586 | 0.596 | 0.682 | 0.642 | 0.570 | 0.662 |
| 18 | 0.549 | 0.602 | 0.814 | 0.549 | 0.750 | 0.492 | 0.794 | 0.643 | 0.579 | 0.626 | 0.591 | 0.549 | 0.507 | 0.616 | 0.639 |
| 19 | 0.577 | 0.503 | 0.571 | 0.535 | 0.602 | 0.589 | 0.537 | 0.578 | 0.585 | 0.534 | 0.556 | 0.605 | 0.719 | 0.685 | 0.667 |
| 20 | 0.555 | 0.651 | 0.542 | 0.597 | 0.683 | 0.519 | 0.589 | 0.611 | 0.625 | 0.503 | 0.603 | 0.629 | 0.772 | 0.540 | 0.614 |
| 21 | 0.595 | 0.704 | 0.598 | 0.635 | 0.574 | 0.645 | 0.656 | 0.637 | 0.520 | 0.533 | 0.615 | 0.551 | 0.502 | 0.544 | 0.596 |
| 22 | 0.532 | 0.727 | 0.699 | 0.486 | 0.546 | 0.593 | 0.575 | 0.591 | 0.606 | 0.607 | 0.636 | 0.531 | 0.572 | 0.715 | 0.597 |
| 23 | 0.687 | 0.649 | 0.606 | 0.591 | 0.599 | 0.628 | 0.549 | 0.736 | 0.591 | 0.666 | 0.585 | 0.570 | 0.533 | 0.533 | 0.571 |
| 24 | 0.640 | 0.585 | 0.517 | 0.680 | 0.697 | 0.580 | 0.641 | 0.638 | 0.683 | 0.557 | 0.553 | 0.569 | 0.644 | 0.636 | 0.588 |
| 25 | 0.691 | 0.527 | 0.611 | 0.602 | 0.579 | 0.602 | 0.616 | 0.500 | 0.519 | 0.583 | 0.520 | 0.605 | 0.565 | 0.530 | 0.621 |
| 26 | 0.579 | 0.765 | 0.567 | 0.651 | 0.515 | 0.628 | 0.636 | 0.527 | 0.620 | 0.568 | 0.534 | 0.750 | 0.509 | 0.578 | 0.608 |
| 27 | 0.614 | 0.508 | 0.584 | 0.681 | 0.757 | 0.687 | 0.601 | 0.662 | 0.636 | 0.603 | 0.617 | 0.633 | 0.581 | 0.569 | 0.763 |
| 28 | 0.614 | 0.498 | 0.636 | 0.612 | 0.669 | 0.668 | 0.662 | 0.635 | 0.651 | 0.524 | 0.537 | 0.637 | 0.716 | 0.574 | 0.683 |
| 29 | 0.627 | 0.559 | 0.642 | 0.655 | 0.586 | 0.494 | 0.666 | 0.688 | 0.589 | 0.696 | 0.624 | 0.596 | 0.729 | 0.726 | 0.617 |

In various embodiments, cross correlations between the length-12 NR sequence and other existing length-X base sequences can be calculated. For example, other length-X base sequences used in LTE can be expressed as:

$$\bar{r}_{u,v}(n) = x_q(n \bmod N_{ZC}^{RS}), \quad 0 \le n < M_{sc}^{RS}$$

where the $q^{th}$ root Zadoff-Chu sequence is defined by $$x_q(m) = e^{-j\frac{\pi q m(m+1)}{N_{ZC}^{RS}}}, \quad 0 \le m \le N_{ZC}^{RS} - 1$$

with q given by $$q = [\bar{q} + \frac{1}{2}] + v \cdot (-1)^{[2\bar{q}]}$$

$$\bar{q} = N_{ZC}^{RS} 19 (u+1)/31$$

The length $N_{ZC}^{RS}$ of the Zadoff-Chu sequence is given by the largest prime number such that $N_{ZC}^{RS} < M_{sc}^{RS}$ where $M_{SC}^{RS} = X$.

With reference to FIG. 2, at block 204, the method includes allocating one or more new sequences to existing sequence groups based on condition(s) on corresponding correlations. Illustratively, cross correlation values that exceed certain threshold or are relatively large can serve as bases for allocating new sequences to existing groups. In some embodiments, for each new NR sequence $S_{1,i}$, the method includes identifying the maximum cross correlation value within a corresponding row of the cross correlation matrix $XCORR_{i,u}$. A group index u=umax(i) that corresponds to the identified maximum cross correlation value is selected, and the new NR sequence $S_{1,i}$ is allocated to existing sequence group of index umax(i).

In cases where a same group index umax(i) is selected for multiple $S_{1,i}$'s, their corresponding cross correlation values $XCORR_{i,umax(i)}$'s are compared with one another. The new NR sequence $S_{1,i}$ that corresponds the largest $XCORR_{i,umax(i)}$ value is allocated to the existing sequence group of index umax(i), and the remaining NR sequences are labeled as unallocated. Continuing the example of the correlation matrix $XCORR_{i,u}$ as shown in Table-3, the allocation of NR sequences to existing groups of index umax(i)'s is illustrated in Table-4 below. A subset of NR sequences $S_{1,i}$ (where i=2, 5, 7, 11, 13, 14, 21, and 22) remain unallocated, and a subset of existing sequence groups (with indices u=0, 6, 12, 15, 18, 23, 26, and 28) are still available to accommodate new sequences.

TABLE-4 partial allocation of NR sequence to existing sequence groups

| i | 0 | 1 | 3 | 4 | 6 | 8 | 9 | 10 | 12 | 15 | 16 | 17 | 18 | 19 | 20 | 23 | 24 | 25 | 26 | 27 | 28 | 29 |
|---|---|---|---|---|---|---|---|----|----|----|----|----|----|----|----|----|----|----|----|----|----|----|
| umax(i) | 10 | 22 | 29 | 25 | 13 | 21 | 8 | 14 | 24 | 1 | 20 | 19 | 17 | 27 | 11 | 7 | 3 | 9 | 16 | 4 | 5 | 2 |

With continued reference to FIG. 2, at block 206, the method includes determining whether all of the new sequences have been allocated. If so, the method ends at block 210. If not, the method proceeds to block 208. At block 208, the method includes determining correlations between each unallocated new sequence and sequence(s) included in each of the remaining existing sequence groups. This can be achieved in a manner similar to block 202, and a new cross correlation matrix (of smaller size) can be generated. Then the method proceeds back to block 204 to continue allocating unallocated new sequence(s) into remaining existing sequence groups.

Sequence Grouping Examples

Using the method of FIG. 2, the final result for allocating the new length-12 NR sequences into existing sequence groups based on cross correlation with the length-24 LTE sequences is illustrated in Table-5 below.

TABLE-5

NR sequence grouping based on cross correlation with length-24 LTE sequences where the cross correlation values corresponding to groups 8, 9, 11, 14, 17, and 24 exceed 0.8

| Group Index u | Sequence Index i | $\phi(0)$ | $\phi(1)$ | $\phi(2)$ | $\phi(3)$ | $\phi(4)$ | $\phi(5)$ | $\phi(6)$ | $\phi(7)$ | $\phi(8)$ | $\phi(9)$ | $\phi(10)$ | $\phi(11)$ |
|---|---|---|---|---|---|---|---|---|---|---|---|---|---|
| 0 | 7 | −3 | 3 | −3 | 3 | 3 | −3 | −1 | −1 | 3 | 3 | 1 | −3 |
| 1 | 15 | −3 | −3 | 3 | 1 | −3 | −3 | −3 | −1 | 3 | −1 | 1 | 3 |
| 2 | 29 | −3 | 3 | 1 | −1 | 3 | 3 | −3 | 1 | −1 | 1 | −1 | 1 |
| 3 | 24 | −3 | 3 | 3 | 1 | −3 | 3 | −1 | 1 | 3 | −3 | 3 | −3 |
| 4 | 27 | −3 | 3 | 1 | −3 | 1 | 3 | −1 | −1 | 1 | 3 | 3 | 3 |
| 5 | 28 | −3 | 3 | −3 | 3 | −3 | −3 | 3 | −1 | −1 | 1 | 3 | −3 |
| 6 | 21 | −3 | 1 | 3 | 3 | −1 | −1 | −3 | 3 | 3 | −3 | 3 | −3 |
| 7 | 23 | −3 | −1 | 3 | 1 | −3 | −1 | −3 | 3 | 1 | 3 | 3 | 1 |
| 8 | 9 | −3 | 3 | 3 | 3 | −1 | −3 | −3 | −1 | −3 | 1 | 3 | −3 |
| 9 | 25 | 3 | −1 | −3 | 3 | −3 | −1 | 3 | 3 | 3 | −3 | −1 | −3 |
| 10 | 0 | 1 | −1 | 3 | 1 | 1 | −1 | −1 | −1 | 1 | 3 | −3 | 1 |
| 11 | 20 | −3 | 1 | −1 | −1 | 3 | 3 | −3 | −1 | −1 | −3 | −1 | −3 |
| 12 | 14 | −3 | −1 | 1 | −3 | 1 | 3 | 3 | 3 | −1 | −3 | 3 | 3 |
| 13 | 6 | −3 | −3 | −1 | 3 | 3 | 3 | −3 | 3 | −3 | 1 | −1 | −3 |

TABLE-5-continued

NR sequence grouping based on cross correlation with length-24 LTE sequences where the cross correlation values corresponding to groups 8, 9, 11, 14, 17, and 24 exceed 0.8

| Group Index u | Sequence Index i | φ(0) | φ(1) | φ(2) | φ(3) | φ(4) | φ(5) | φ(6) | φ(7) | φ(8) | φ(9) | φ(10) | φ(11) |
|---|---|---|---|---|---|---|---|---|---|---|---|---|---|
| 14 | 10 | 1 | 3 | −3 | 1 | 3 | 3 | 3 | 1 | −1 | 1 | −1 | 3 |
| 15 | 2 | −3 | 1 | −3 | −3 | −3 | 3 | −3 | −1 | 1 | 1 | 1 | −3 |
| 16 | 26 | 1 | −1 | 3 | −1 | −1 | −1 | −3 | −1 | 1 | 1 | 1 | −3 |
| 17 | 18 | −3 | −1 | 3 | −3 | −3 | −1 | −3 | 1 | −1 | −3 | 3 | 3 |
| 18 | 11 | −1 | −3 | 3 | −1 | −3 | −3 | −3 | −1 | 1 | −1 | 1 | −3 |
| 19 | 17 | −3 | −1 | −1 | 1 | 3 | 1 | 1 | −1 | 1 | −1 | −3 | 1 |
| 20 | 16 | −1 | 1 | 3 | −3 | 1 | −1 | 1 | −1 | −1 | −3 | 1 | −1 |
| 21 | 8 | −3 | −1 | −3 | −1 | −1 | −3 | 3 | 3 | −1 | −1 | 1 | −3 |
| 22 | 1 | −1 | −1 | −1 | −1 | 1 | −3 | −1 | 3 | 3 | −1 | −3 | 1 |
| 23 | 13 | −3 | −3 | 3 | 3 | 3 | −3 | −1 | 1 | −3 | 3 | 1 | −3 |
| 24 | 12 | 3 | 1 | 3 | 1 | 3 | −3 | −1 | 1 | 3 | 1 | −1 | −3 |
| 25 | 4 | −3 | 1 | 3 | −1 | −1 | −3 | −3 | −1 | −1 | 3 | 1 | −3 |
| 26 | 5 | −1 | 1 | 1 | −1 | 1 | 3 | 3 | −1 | −1 | −3 | 1 | −3 |
| 27 | 19 | −3 | −3 | 3 | −3 | −1 | 3 | 3 | 3 | −1 | −3 | 1 | −3 |
| 28 | 22 | −3 | −1 | −1 | −3 | −3 | −1 | −3 | 3 | 1 | 3 | −1 | −3 |
| 29 | 3 | −3 | 3 | 1 | 3 | −3 | 1 | 1 | 1 | 1 | 3 | −3 | 3 |

Using the same method, the final result for allocating the new length-12 NR sequences into existing sequence groups based on cross correlation with the length-12 LTE sequences is illustrated in Table-6 below.

TABLE-6 sequence grouping based on cross correlation with length-12 LTE sequences, where the cross correlation values corresponding to groups 0, 1, 3, 11, 13, 15, 18, 22, 25, 27, and 29 exceed 0.78 and the cross correlation values corresponding to groups 3, 13, 15, 22, and 25 exceed 0.8

| Group Index u | Sequence Index i | φ(0) | φ(1) | φ(2) | φ(3) | φ(4) | φ(5) | φ(6) | φ(7) | φ(8) | φ(9) | φ(10) | φ(11) |
|---|---|---|---|---|---|---|---|---|---|---|---|---|---|
| 0 | 29 | −3 | 3 | 1 | −1 | 3 | 3 | −3 | 1 | −1 | 1 | −1 | 1 |
| 1 | 1 | −3 | 3 | 1 | −3 | 1 | 3 | −1 | −1 | 1 | 3 | 3 | 3 |
| 2 | 28 | −3 | 3 | 3 | 1 | −3 | 3 | −1 | 1 | 3 | −3 | 3 | −3 |
| 3 | 20 | −3 | 3 | 1 | 3 | −3 | 1 | 1 | 1 | 1 | 3 | −3 | 3 |
| 4 | 22 | −1 | −3 | 3 | −1 | −3 | −3 | −3 | −1 | 1 | −1 | 1 | −3 |
| 5 | 4 | −3 | −3 | 3 | 1 | −3 | −3 | −3 | −1 | 3 | −1 | 1 | 3 |
| 6 | 27 | 1 | −1 | 3 | −1 | −1 | −1 | −3 | −1 | 1 | 1 | 1 | −3 |
| 7 | 5 | −3 | −1 | −1 | 1 | 3 | 1 | 1 | −1 | 1 | −1 | −3 | 1 |
| 8 | 0 | −3 | −1 | −1 | −3 | −3 | −1 | −3 | 3 | 1 | 3 | −1 | −3 |
| 9 | 19 | −1 | 1 | 1 | −1 | 1 | 3 | 3 | −1 | −1 | −3 | 1 | −3 |
| 10 | 26 | −3 | 1 | −1 | −1 | 3 | 3 | −3 | −1 | −1 | −3 | −1 | −3 |
| 11 | 10 | −3 | −3 | 3 | −3 | −1 | 3 | 3 | 3 | −1 | −3 | 1 | −3 |
| 12 | 3 | 1 | −1 | 3 | 1 | 1 | −1 | −1 | −1 | 1 | 3 | −3 | 1 |
| 13 | 12 | −3 | −1 | 3 | −3 | −3 | −1 | −3 | 1 | −1 | −3 | 3 | 3 |
| 14 | 14 | 3 | 1 | 3 | 1 | 3 | −3 | −1 | 1 | 3 | 1 | −1 | −3 |
| 15 | 6 | −3 | 1 | 3 | −1 | −1 | −3 | −3 | −1 | −1 | 3 | 1 | −3 |
| 16 | 8 | −1 | −1 | −1 | −1 | 1 | −3 | −1 | 3 | 3 | −1 | −3 | 1 |
| 17 | 16 | −1 | 1 | 3 | −3 | 1 | −1 | 1 | −1 | −1 | −3 | 1 | −1 |
| 18 | 18 | −3 | 1 | 3 | 3 | −1 | −1 | −3 | 3 | 3 | −3 | 3 | −3 |
| 19 | 7 | −3 | −1 | −3 | −1 | −1 | −3 | 3 | 3 | −1 | −1 | 1 | −3 |
| 20 | 2 | −3 | −3 | −1 | 3 | 3 | 3 | −3 | 3 | −3 | 1 | −1 | −3 |
| 21 | 11 | −3 | −1 | 3 | 1 | −3 | −1 | −3 | 3 | 1 | 3 | 3 | 1 |
| 22 | 9 | −3 | 3 | 3 | 3 | −1 | −3 | −3 | −1 | −3 | 1 | 3 | −3 |
| 23 | 24 | 3 | −1 | −3 | 3 | −3 | −1 | 3 | 3 | 3 | −3 | −1 | −3 |
| 24 | 23 | −3 | −1 | 1 | −3 | 1 | 3 | 3 | 3 | −1 | −3 | 3 | 3 |
| 25 | 21 | 1 | 3 | −3 | 1 | 3 | 3 | 3 | 1 | −1 | 1 | −1 | 3 |
| 26 | 15 | −3 | 1 | −3 | −3 | −3 | 3 | −3 | −1 | 1 | 1 | 1 | −3 |
| 27 | 13 | −3 | −3 | 3 | 3 | 3 | −3 | −1 | 1 | −3 | 3 | 1 | −3 |
| 28 | 25 | −3 | 3 | −3 | 3 | 3 | −3 | −1 | −1 | 3 | 3 | 1 | −3 |
| 29 | 17 | −3 | 3 | −3 | 3 | −3 | −3 | 3 | −1 | −1 | 1 | 3 | −3 |

Using the same method, the final result for allocating the new length-12 NR sequences into existing sequence groups based on cross correlation with the length-36 LTE sequences is illustrated in Table-7 below.

TABLE-7 sequence grouping based on cross correlation with length-36 LTE sequences, where the cross correlation values corresponding to groups 1, 2, 6, 15, 16, 22, 23, and 27 exceed 0.8

| Group Index u | Sequence Index i | φ(0) | φ(1) | φ(2) | φ(3) | φ(4) | φ(5) | φ(6) | φ(7) | φ(8) | φ(9) | φ(10) | φ(11) |
|---|---|---|---|---|---|---|---|---|---|---|---|---|---|
| 0 | 29 | −3 | 3 | 1 | −1 | 3 | 3 | −3 | 1 | −1 | 1 | −1 | 1 |
| 1 | 27 | −3 | 3 | 1 | −3 | 1 | 3 | −1 | −1 | 1 | 3 | 3 | 3 |
| 2 | 24 | −3 | 3 | 3 | 1 | −3 | 3 | −1 | 1 | 3 | −3 | 3 | −3 |
| 3 | 3 | −3 | 3 | 1 | 3 | −3 | 1 | 1 | 1 | 1 | 3 | −3 | 3 |
| 4 | 11 | −1 | −3 | 3 | −1 | −3 | −3 | −3 | −1 | 1 | −1 | 1 | −3 |
| 5 | 15 | −3 | −3 | 3 | 1 | −3 | −3 | −3 | −1 | 3 | −1 | 1 | 3 |
| 6 | 26 | 1 | −1 | 3 | −1 | −1 | −1 | −3 | −1 | 1 | 1 | 1 | −3 |
| 7 | 17 | −3 | −1 | −1 | 1 | 3 | 1 | 1 | −1 | 1 | −1 | −3 | 1 |
| 8 | 22 | −3 | −1 | −1 | −3 | −3 | −1 | −3 | 3 | 1 | 3 | −1 | −3 |
| 9 | 5 | −1 | 1 | 1 | −1 | 1 | 3 | 3 | −1 | −1 | −3 | 1 | −3 |
| 10 | 20 | −3 | 1 | −1 | −1 | 3 | 3 | −3 | −1 | −1 | −3 | −1 | −3 |
| 11 | 19 | −3 | −3 | 3 | −3 | −1 | 3 | 3 | 3 | −1 | −3 | 1 | −3 |
| 12 | 0 | 1 | −1 | 3 | 1 | 1 | −1 | −1 | −1 | 1 | 3 | −3 | 1 |
| 13 | 18 | −3 | −1 | 3 | −3 | −3 | −1 | −3 | 1 | −1 | −3 | 3 | 3 |
| 14 | 12 | 3 | 1 | 3 | 1 | 3 | −3 | −1 | 1 | 3 | 1 | −1 | −3 |
| 15 | 4 | −3 | 1 | 3 | −1 | 3 | −3 | −3 | −1 | −1 | 3 | 1 | −3 |
| 16 | 1 | −1 | −1 | −1 | −1 | 1 | −3 | −1 | 3 | 3 | −1 | −3 | 1 |
| 17 | 16 | −1 | 1 | 3 | −3 | 1 | −1 | 1 | −1 | −1 | −3 | 1 | −1 |
| 18 | 21 | −3 | 1 | 3 | 3 | −1 | −1 | −3 | 3 | 3 | −3 | 3 | −3 |
| 19 | 8 | −3 | −1 | −3 | −1 | −1 | −3 | 3 | 3 | −1 | −1 | 1 | −3 |
| 20 | 6 | −3 | −3 | −1 | 3 | 3 | 3 | −3 | 3 | −3 | 1 | −1 | −3 |
| 21 | 23 | −3 | −1 | 3 | 1 | −3 | −1 | −3 | 3 | 1 | 3 | 3 | 1 |
| 22 | 9 | −3 | 3 | 3 | 3 | −1 | −3 | −3 | −1 | −3 | 1 | 3 | −3 |
| 23 | 25 | 3 | −1 | −3 | 3 | −3 | −1 | 3 | 3 | 3 | −3 | −1 | −3 |
| 24 | 14 | −3 | −1 | 1 | −3 | 1 | 3 | 3 | 3 | −1 | −3 | 3 | 3 |
| 25 | 10 | 1 | 3 | −3 | 1 | 3 | 3 | 3 | 1 | −1 | 1 | −1 | 3 |
| 26 | 2 | −3 | 1 | −3 | −3 | −3 | 3 | −3 | −1 | 1 | 1 | 1 | −3 |
| 27 | 13 | −3 | −3 | 3 | 3 | 3 | −3 | −1 | 1 | −3 | 3 | 1 | −3 |
| 28 | 7 | −3 | 3 | −3 | 3 | 3 | −3 | −1 | −1 | 3 | 3 | 1 | −3 |
| 29 | 28 | −3 | 3 | −3 | 3 | −3 | −3 | 3 | −1 | −1 | 1 | 3 | −3 |

In some embodiments, the method of FIG. 2 can determine cross correlations between an individual new sequence and multiple existing sequences (e.g., both length-24 and length-36 sequences) of a same existing group, for example, at blocks 202 and/or 208. In these embodiments, a comparison among these cross correlation values can be performed to determine a group-level cross correlation value (e.g., the maximum cross correlation value resulted from the comparison) for the new sequence and the existing group, and sequence allocation can be performed based thereon. The final result for allocating the new length-12 NR sequences into existing sequence groups based on cross correlation with the length-24 and length-36 LTE sequences is illustrated in Table-8 below.

TABLE-8 sequence grouping based on cross correlation with length-24 and length-36 LTE sequences, where the cross correlation values corresponding to groups 1, 2, 6, 8, 9, 11, 14-17, 23, 24, and 27 exceed 0.8

| Group Index u | Sequence Index i | φ(0) | φ(1) | φ(2) | φ(3) | φ(4) | φ(5) | φ(6) | φ(7) | φ(8) | φ(9) | φ(10) | φ(11) |
|---|---|---|---|---|---|---|---|---|---|---|---|---|---|
| 0 | 29 | −3 | 3 | 1 | −1 | 3 | 3 | −3 | 1 | −1 | 1 | −1 | 1 |
| 1 | 27 | −3 | 3 | 1 | −3 | 1 | 3 | −1 | −1 | 1 | 3 | 3 | 3 |
| 2 | 24 | −3 | 3 | 3 | 1 | −3 | 3 | −1 | 1 | 3 | −3 | 3 | −3 |
| 3 | 3 | −3 | 3 | 1 | 3 | −3 | 1 | 1 | 1 | 1 | 3 | −3 | 3 |
| 4 | 11 | −1 | −3 | 3 | −1 | −3 | −3 | −3 | −1 | 1 | −1 | 1 | −3 |
| 5 | 15 | −3 | −3 | 3 | 1 | −3 | −3 | −3 | −1 | 3 | −1 | 1 | 3 |
| 6 | 26 | 1 | −1 | 3 | −1 | −1 | −1 | −3 | −1 | 1 | 1 | 1 | −3 |
| 7 | 23 | −3 | −1 | 3 | 1 | −3 | −1 | −3 | 3 | 1 | 3 | 3 | 1 |
| 8 | 9 | −3 | 3 | 3 | 3 | −1 | −3 | −3 | −1 | −3 | 1 | 3 | −3 |
| 9 | 5 | −1 | 1 | 1 | −1 | 1 | 3 | 3 | −1 | −1 | −3 | 1 | −3 |
| 10 | 0 | 1 | −1 | 3 | 1 | 1 | −1 | −1 | −1 | 1 | 3 | −3 | 1 |
| 11 | 20 | −3 | 1 | −1 | −1 | 3 | 3 | −3 | −1 | −1 | −3 | −1 | −3 |

TABLE-8-continued sequence grouping based on cross correlation with length-24 and length-36 LTE
sequences, where the cross correlation values corresponding to groups 1, 2, 6, 8,
9, 11, 14-17, 23, 24, and 27 exceed 0.8

| Group Index u | Sequence Index i | φ(0) | φ(1) | φ(2) | φ(3) | φ(4) | φ(5) | φ(6) | φ(7) | φ(8) | φ(9) | φ(10) | φ(11) |
|---|---|---|---|---|---|---|---|---|---|---|---|---|---|
| 12 | 14 | −3 | −1 | 1 | −3 | 1 | 3 | 3 | 3 | −1 | −3 | 3 | 3 |
| 13 | 6 | −3 | −3 | −1 | 3 | 3 | 3 | −3 | 3 | −3 | 1 | −1 | −3 |
| 14 | 8 | −3 | −1 | −3 | −1 | −1 | −3 | 3 | 3 | −1 | −1 | 1 | −3 |
| 15 | 4 | −3 | 1 | 3 | −1 | −1 | −3 | −3 | −1 | −1 | 3 | 1 | −3 |
| 16 | 1 | −1 | −1 | −1 | −1 | 1 | −3 | −1 | 3 | 3 | −1 | −3 | 1 |
| 17 | 18 | −3 | −1 | 3 | −3 | −3 | −1 | −3 | 1 | −1 | −3 | 3 | 3 |
| 18 | 21 | −3 | 1 | 3 | 3 | −1 | −1 | −3 | 3 | 3 | −3 | 3 | −3 |
| 19 | 17 | −3 | −1 | −1 | 1 | 3 | 1 | 1 | −1 | 1 | −1 | −3 | 1 |
| 20 | 16 | −1 | 1 | 3 | −3 | 1 | −1 | 1 | −1 | −1 | −3 | 1 | −1 |
| 21 | 22 | −3 | −1 | −1 | −3 | −3 | −1 | −3 | 3 | 1 | 3 | −1 | −3 |
| 22 | 19 | −3 | −3 | 3 | −3 | −1 | 3 | 3 | 3 | −1 | −3 | 1 | −3 |
| 23 | 25 | 3 | −1 | −3 | 3 | −3 | −1 | 3 | 3 | 3 | −3 | −1 | −3 |
| 24 | 12 | 3 | 1 | 3 | 1 | 3 | −3 | −1 | 1 | 3 | 1 | −1 | −3 |
| 25 | 10 | 1 | 3 | −3 | 1 | 3 | 3 | 3 | 1 | −1 | 1 | −1 | 3 |
| 26 | 2 | −3 | 1 | −3 | −3 | −3 | 3 | −3 | −1 | 1 | 1 | 1 | −3 |
| 27 | 13 | −3 | −3 | 3 | 3 | 3 | −3 | −1 | 1 | −3 | 3 | 1 | −3 |
| 28 | 7 | −3 | 3 | −3 | 3 | 3 | −3 | −1 | −1 | 3 | 3 | 1 | −3 |
| 29 | 28 | −3 | 3 | −3 | 3 | −3 | −3 | 3 | −1 | −1 | 1 | 3 | −3 |

Various communication nodes (e.g., UE or base station) can use the grouping of new NR sequences, as disclosed herein, for communication with other communication node(s). In LTE, the sequence group number(s) for use by a UE is determined based on a group hopping pattern and a sequence shift pattern, which is known between the base station and UE. The group hopping pattern is cell-specific and the UE can obtain the group hopping pattern based on Cell ID. A same or similar mechanism can be implemented in NR for sequence group based communication.

Alternatively or in addition, sequence group number(s) can be provided from base station to UE, for example, by higher layer signaling through RRC (Radio Resource Control), physical layer signaling through DCI (Downlink Control Information), or the like. Once a sequence group number is determined, the UE can select a suitable sequence from the sequence group for transmission, for example, based on sequence length. Sequence grouping based on the presently disclosed technology can mitigate interference between or among different cells, at least because the cross correlations between the sequences used for different cells are relatively low.

Figure 4:
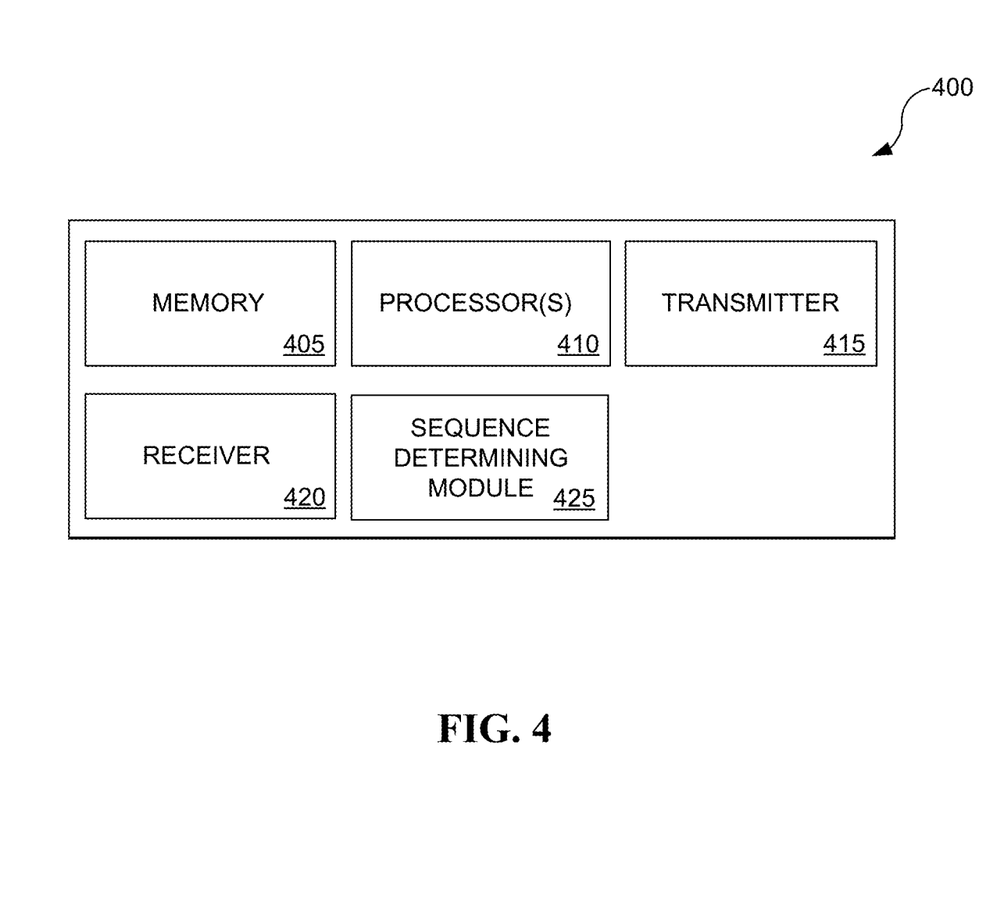
FIG. 4 shows an exemplary block diagram of a UE utilizing sequence groups, in accordance with some embodiments of the presently disclosed technology.

FIG. 4 shows an exemplary block diagram of a UE 400 utilizing sequence groups, in accordance with some embodiments of the presently disclosed technology. The UE 400 includes at least one processor 410 and a memory 405 having instructions stored thereupon. The instructions upon execution by the processor 410 configure the UE 400 to perform several operations using the various modules.

The UE 400 can include a sequence determining module 425. The sequence determining module 425 can determine sequence group(s) for use by the UE (e.g., based on identification of at least a cell, user, or communication channel), select sequence(s) from a sequence group for data transmission based thereon, or perform other sequence determining related functions, in accordance with various embodiments of the presently disclosed technology. The receiver 420 can receive one or more messages (e.g., including information providing or assigning sequence groups to cells), and the transmitter 415 can transmit data (e.g., via short PUCCH to a base station) using one or more sequences selected from sequence group(s) configured in accordance with various embodiments of the presently disclosed technology.

Figure 5:
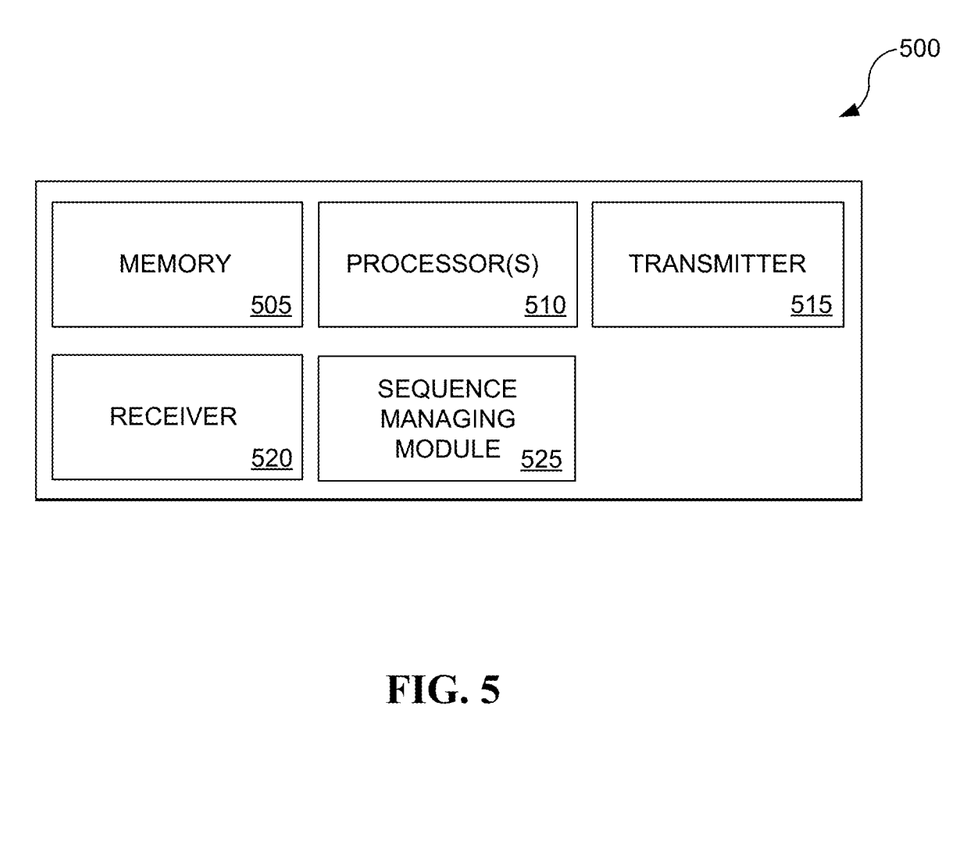
FIG. 5 shows an exemplary block diagram of a base station managing sequence groups, in accordance with some embodiments of the presently disclosed technology.

FIG. 5 shows an exemplary block diagram of a base station 500 managing sequence groups, in accordance with some embodiments of the presently disclosed technology. The base station 500 includes at least one processor 510 and a memory 505 having instructions stored thereupon. The instructions upon execution by the processor 510 configure the base station 500 to perform several operations using the various modules.

The base station 500 can include a sequence managing module 525. The sequence managing module 525 can allocate and group sequences, assign sequence groups to cells, determine sequence group(s) used by UE(s), or perform other sequence related functions, in accordance with various embodiments of the presently disclosed technology. The receiver 520 can receive data transmitted using sequence(s) selected from sequence group(s) that are configured in accordance with various embodiments of the presently disclosed technology, and the transmitter 515 can transmit one or more messages (e.g., for providing or assigning sequence groups to cells) to one or more UEs.

The term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for wireless communication, comprising: communicating with a wireless communication node based, at least in part, on a distinguished target sequence included in a distinguished sequence group, the distinguished sequence group selected from a plurality of sequence groups,
wherein the distinguished target sequence is a member of a target sequence set, and each target sequence of the target sequence set is allocated to an individual sequence group of the plurality of sequence groups based, at least in part, on a value of correlation between the target sequence and at least one other sequence of the individual sequence group,
wherein the at least one other sequence includes at least a length-X sequence, wherein X=12N and N is an integer larger than 0,
wherein the length-X sequence is a length-36 sequence that corresponds to a mathematical form of:

$$\bar{r}_{u,v}(n) = x_q(n \bmod N_{ZC}^{RS}), \quad 0 \leq n < M_{sc}^{RS},$$

$0 \leq n < M_{sc}^{RS}$, wherein a $q^{th}$ root Zadoff-Chu sequence is defined by:

$$x_q(m) = e^{-j\frac{\pi q m(m+1)}{N_{ZC}^{RS}}}, \quad 0 \leq m \leq N_{ZC}^{RS} - 1$$

wherein q is given by:

$$q = \lfloor \bar{q} + \frac{1}{2} \rfloor + v \cdot (-1)^{\lfloor 2\bar{q} \rfloor}$$

$$\bar{q} = N_{ZC}^{RS} 19(u+1)/31,$$

and
wherein a length $N_{ZC}^{RS}$ of the Zadoff-Chu sequence is given by a largest prime number such that $N_{ZC}^{RS} < M_{sc}^{RS}$ where $M_{sc}^{RS} = X$, and wherein v=0,
wherein the plurality of sequence groups includes at least one of:
a sequence group including a length-12 target sequence and one other length-36 sequence, wherein the length-12 target sequence corresponds to $\varphi(n) = [3\ -1\ -3\ 3\ -3\ -1\ 3\ 3\ 3\ -3\ -1\ -3]$ and wherein the other length-36 sequence corresponds to $\bar{r}_{u,v}(n)$ with u=23 and v=0,
a sequence group including a length-12 target sequence and one other length-36 sequence, wherein the length-12 target sequence corresponds to $\varphi(n) = [1\ -1\ 3\ 1\ 1\ 1\ 3\ 1\ 1\ 1\ 1\ -3]$ and wherein the other length-36 sequence corresponds to $\bar{r}_{u,v}(n)$ with u=6 and v=0,
a sequence group including a length-12 target sequence and one other length-36 sequence, wherein the length-12 target sequence corresponds to $\varphi(n) = [-1\ -1\ -1\ -1\ 1\ -3\ -1\ 3\ 3\ -1\ -3\ 1]$ and wherein the other length-36 sequence corresponds to $\bar{r}_{u,v}(n)$ with u=16 and v=0,
a sequence group including a length-12 target sequence and one other length-36 sequence, wherein the length-12 target sequence corresponds to $\varphi(n) = [-3\ -3\ 3\ 3\ 3\ -3\ -1\ 1\ -3\ 3\ 1\ -3]$ and wherein the other length-36 sequence corresponds to $\bar{r}_{u,v}(n)$ with u=27 and v=0,
a sequence group including a length-12 target sequence and one other length-36 sequence, wherein the length-12 target sequence corresponds to $\varphi(n) = [-3\ -3\ 3\ -3\ -1\ 3\ 3\ 3\ -1\ -3\ 1\ -3]$ and wherein the other length-36 sequence corresponds to $\bar{r}_{u,v}(n)$ with u=22 and v=0,
a sequence group including a length-12 target sequence and one other length-36 sequence, wherein the length-12 target sequence corresponds to $\varphi(n) = [-3\ 3\ 1\ -3\ 1\ 3\ -1\ 4\ 1\ 3\ 3\ 3]$ and wherein the other length-36 sequence corresponds to $\bar{r}_{u,v}(n)$ with u=1 and v=0,
a sequence group including a length-12 target sequence and one other length-36 sequence, wherein the length-12 target sequence corresponds to $\varphi(n) = [-3\ 3\ 3\ 1\ -3\ 3\ 4\ 1\ 3\ -3\ 3\ -3]$ and wherein the other length-36 sequence corresponds to $\bar{r}_{u,v}(n)$ with u=2 and v=0, or
a sequence group including a length-12 target sequence and one other length-36 sequence, wherein the length-12 target sequence corresponds to $\varphi(n) = [-3\ 1\ 3\ 1\ 1\ 3\ 3\ 1\ 1\ 3\ 1\ -3]$ and wherein the other length-36 sequence corresponds to $\bar{r}_{u,v}(n)$ with u=15 and v=0.

2. The method of claim 1, wherein fewer than 2 sequence pairs between a length-12 sequence in any sequence group of the plurality of sequence groups and a length-36 sequence in any other sequence group of the plurality of sequence groups has a corresponding value of correlation that exceeds 0.8.

3. The method of claim 1, wherein the distinguished sequence group is selected based, at least in part, on identification of at least a cell, user, or communication channel.

4. The method of claim 1, wherein communicating with the wireless communication node comprises using the distinguished target sequence for transmitting wireless signals to the wireless communication node or receiving wireless signals from the wireless communication node.

5. The method of claim 1, wherein the wireless communication node is a user equipment (UE) or a base station.

6. The method of claim 1, wherein the value of correlation between the target sequence and the at least one other sequence is calculated based on:

xcorr_coeffs=$NFFT*IFFT(Seq1.*conj(Seq2),NFFT)$/length(Seq1)

wherein, IFFT(X,N) is an N_point Inverse Fourier Transform operation, Seq1 denotes the target sequence, Seq2 denotes one other sequence, and conj( ) is a complex conjugate operation.

7. The method of claim 1, wherein each target sequence of the target sequence set is allocated to an individual sequence group of the plurality of sequence groups is further based on a comparison of (1) the value of correlation between the target sequence and the at least one other sequence of the individual sequence group and (2) at least a value of correlation between the target sequence and one or more sequences of another sequence group.

8. An apparatus for wireless communication, comprising a processor that is configured to:
communicate with a wireless communication node based, at least in part, on a distinguished target sequence included in a distinguished sequence group, the distinguished sequence group selected from a plurality of sequence groups,
wherein the distinguished target sequence is a member of a target sequence set, and each target sequence of the target sequence set is allocated to an individual sequence group of the plurality of sequence groups based, at least in part, on a value of correlation between the target sequence and at least one other sequence of the individual sequence group,
wherein the at least one other sequence includes at least a length-X sequence, wherein X=12N and N is an integer larger than 0,
wherein the length-X sequence is a length-36 sequence that corresponds to a mathematical form of:

$\bar{r}_{u,v}(n) = x_q(n \bmod N_{ZC}^{RS})$, $0 \le n < M_{sc}^{RS}$, $0 \le n < M_{sc}^{RS}$,
wherein a $q^{th}$ root Zadoff-Chu sequence is defined by:

$$x_q(m) = e^{-j\frac{\pi q m(m+1)}{N_{ZC}^{RS}}}, \ 0 \le m \le N_{ZC}^{RS} - 1$$

wherein q is given by:

$q = [\bar{q}+\frac{1}{2}] + v \cdot (-1)^{[2\bar{q}]}$ $\bar{q} = N_{ZC}^{RS} 19 \ (u+1)/31$, and
wherein a length $N_{ZC}^{RS}$ of the Zadoff-Chu sequence is given by a largest prime number such that $N_{ZC}^{RS} < M_{sc}^{RS}$ where $M_{sc}^{RS} = X$, and wherein v=0,
wherein the plurality of sequence groups include at least one of:
a sequence group including a length-12 target sequence and one other length-36 sequence, wherein the length-12 target sequence corresponds to φ(n)=[3 −1 −3 3 −3 −1 3 3 3 −3 −1 −3] and wherein the other length-36 sequence corresponds to $\bar{r}_{u,v}(n)$ with u=23 and v=0,
a sequence group including a length-12 target sequence and one other length-36 sequence, wherein the length-12 target sequence corresponds to φ(n) [1 −1 3 1 1 1 3 1 1 1 1 −3] and wherein the other length-36 sequence corresponds to $\bar{r}_{u,v}(n)$ with u=6 and v=0,
a sequence group including a length-12 target sequence and one other length-36 sequence, wherein the length-12 target sequence corresponds to φ(n)=[−1 −1 −1 −1 1 −3 −1 3 3 −1 −3 1] and wherein the other length-36 sequence corresponds to $\bar{r}_{u,v}(n)$ with u=16 and v=0,
a sequence group including a length-12 target sequence and one other length-36 sequence, wherein the length-12 target sequence corresponds to φ(n)=[−3 −3 3 3 3 −3 −1 1 −3 3 1 −3] and wherein the other length-36 sequence corresponds to $\bar{r}_{u,v}^{(n)}$ with u=27 and v=0,
a sequence group including a length-12 target sequence and one other length-36 sequence, wherein the length-12 target sequence corresponds to φ(n)=[−3 −3 3 3 −3 −1 3 3 3 −1 −3 1 −3] and wherein the other length-36 sequence corresponds to $\bar{r}_{u,v}(n)$ with u=22 and v=0,
a sequence group including a length-12 target sequence and one other length-36 sequence, wherein the length-12 target sequence corresponds to φ(n)=[−3 3 1 −3 1 3 −1 4 1 3 3 3] and wherein the other length-36 sequence corresponds to $\bar{r}_{u,v}(n)$ with u=1 and v=0,
a sequence group including a length-12 target sequence and one other length-36 sequence, wherein the length-12 target sequence corresponds to φ(n)=[−3 3 3 1 −3 3 4 1 3 −3 3 −3] and wherein the other length-36 sequence corresponds to $\bar{r}_{u,v}(n)$ with u=2 and v=0, or
a sequence group including a length-12 target sequence and one other length-36 sequence, wherein the length-12 target sequence corresponds to φ(n)=[−3 1 3 1 1 3 3 1 1 3 1 −3] and wherein the other length-36 sequence corresponds to $\bar{r}_{u,v}(n)$ with u=15 and v=0.

9. The apparatus of claim 8, wherein fewer than 2 sequence pairs between a length-12 sequence in any sequence group of the plurality of sequence groups and a length-36 sequence in any other sequence group of the plurality of sequence groups has a corresponding value of correlation that exceeds 0.8.

10. The apparatus of claim 8, wherein the distinguished sequence group is selected based, at least in part, on identification of at least a cell, user, or communication channel.

11. The apparatus of claim 8, wherein the processor is configured to use the distinguished target sequence for transmitting wireless signals to the wireless communication node or receiving wireless signals from the wireless communication node.

12. The apparatus of claim 8, wherein the wireless communication node is a user equipment (UE) or a base station.

13. The apparatus of claim 8, wherein the value of correlation between the target sequence and the at least one other sequence is calculated based on:

xcorr_coeffs=$NFFT*IFFT(Seq1.*conj(Seq2),NFFT)$/length(Seq1)

wherein, IFFT(X,N) is an N_point Inverse Fourier Transform operation, Seq1 denotes the target sequence, Seq2 denotes one other sequence, and conj( ) is a complex conjugate operation.

14. The apparatus of claim 8, wherein each target sequence of the target sequence set is allocated to an individual sequence group of the plurality of sequence groups is further based on a comparison of (1) the value of correlation between the target sequence and the at least one other sequence of the individual sequence group and (2) at least a value of correlation between the target sequence and one or more sequences of another sequence group.

* * * * *